United States Patent
Hendrickson

(10) Patent No.: US 12,288,129 B2
(45) Date of Patent: Apr. 29, 2025

(54) SYSTEM AND METHOD USING MULTIPLE ENTANGLED LINEAR QUBIT ARRAYS FOR QUANTUM COMPUTING

(71) Applicant: KBR Wyle Services, LLC, Houston, TX (US)

(72) Inventor: Peter Carl Hendrickson, Reston, VA (US)

(73) Assignee: KBR Wyle Services, LLC

( * ) Notice: Subject to any disclaimer, the term of this patent is extended or adjusted under 35 U.S.C. 154(b) by 689 days.

(21) Appl. No.: 17/510,547

(22) Filed: Oct. 26, 2021

(65) Prior Publication Data

US 2022/0366287 A1    Nov. 17, 2022
US 2023/0385667 A9    Nov. 30, 2023

Related U.S. Application Data

(63) Continuation-in-part of application No. 17/090,747, filed on Nov. 5, 2020, now Pat. No. 11,770,984.

(60) Provisional application No. 63/186,037, filed on May 7, 2021, provisional application No. 62/933,148, filed on Nov. 8, 2019.

(51) Int. Cl.
G06N 10/00    (2022.01)
G06N 10/20    (2022.01)
G06N 10/40    (2022.01)

(52) U.S. Cl.
CPC ............. *G06N 10/00* (2019.01); *G06N 10/20* (2022.01); *G06N 10/40* (2022.01)

(58) Field of Classification Search
CPC ......... G06N 10/00; G06N 10/20; G06N 10/40
See application file for complete search history.

(56) References Cited

U.S. PATENT DOCUMENTS

| | | | |
|---|---|---|---|
| 5,793,091 A * | 8/1998 | Devoe | G06N 10/00 |
| | | | 257/17 |
| 6,437,413 B1 | 8/2002 | Yamaguchi et al. | |
| 9,858,531 B1 | 1/2018 | Monroe et al. | |
| 10,192,168 B2 | 1/2019 | Rigetti et al. | |
| 10,248,491 B1 | 4/2019 | Zeng et al. | |
| 11,157,826 B2 | 10/2021 | Figgatt et al. | |
| 11,354,589 B2 | 6/2022 | Kim et al. | |

(Continued)

FOREIGN PATENT DOCUMENTS

| | | |
|---|---|---|
| CA | 3157734 | 5/2021 |
| CN | 114938669 A1 | 8/2022 |

(Continued)

OTHER PUBLICATIONS

J.I. Cirac & P. Zoller, Institute for Theoretical Physics, University of Innsbruck, Austria "A Scalable Quantum Computer with Ions in an Array of Microtraps," Nature, vol. 404, p. 579-58, (2000) www.nature.com;.

(Continued)

*Primary Examiner* — William F Kraig

(57) ABSTRACT

A quantum computing (QC) system includes a plurality of qubits arranged in a plurality of substantially linear regions having longitudinal axes that are substantially parallel to one another. At least some of the substantially linear regions include two or more qubits and one or more qubits of each substantially linear region are configured to interact with one or more qubits of at least one other substantially linear region.

31 Claims, 13 Drawing Sheets

(56) References Cited

U.S. PATENT DOCUMENTS

| | | |
|---|---|---|
| 2006/0179029 A1 | 8/2006 | Vala et al. |
| 2012/0319684 A1 | 12/2012 | Gambetta et al. |
| 2016/0125311 A1 | 5/2016 | Fuechsle et al. |
| 2016/0335560 A1 | 11/2016 | Mohseni et al. |
| 2017/0337155 A1 | 11/2017 | Novotny |
| 2018/0114138 A1 | 4/2018 | Monroe et al. |
| 2018/0175241 A1 | 6/2018 | Jain |
| 2019/0229189 A1 | 7/2019 | Clarke et al. |
| 2021/0027188 A1 | 1/2021 | Nickerson et al. |
| 2021/0142204 A1 | 5/2021 | Hendrickson et al. |
| 2023/0015801 A1 | 1/2023 | Hendrickson et al. |

FOREIGN PATENT DOCUMENTS

| | | |
|---|---|---|
| EP | 4055532 | 9/2022 |
| GB | 2606876 | 11/2022 |
| HK | 40080078 A | 4/2023 |
| JP | 2002112391 A | 4/2002 |
| JP | 2019531592 | 10/2019 |
| JP | 2023500405 | 1/2023 |
| WO | 2017214331 | 12/2017 |
| WO | 2019178009 | 9/2019 |
| WO | 2020033692 | 2/2020 |
| WO | 2021092233 A1 | 5/2021 |
| WO | 2022250933 A2 | 12/2022 |

OTHER PUBLICATIONS

J. Chiaverini et al., Rinton Press, Surface-Electrode Architecture for Ion-Trap Quantum Information Processing, Quantum Information and Computation, vol. 5, No. 6 (2005) pp. 419-439.

N.M. Linke et al., Joint Quantum Institute, Department of Physics, University of Maryland "Experimental Comparison of Two Quantum Computing Architectures," PNAS, vol. 114, No. 13 (2017) pp. 3305-3310.

C. Figgatt et al., NATURE, "Parallel Entangling Operations on a Universal Ion-Trap Quantum Computer," vol. 571 (2019) {https://www.nature.com/articles/s41586-019-1427-5}.

Y. Lu et al., NATURE, "Global Entangling Gates on Arbitrary Qubits," vol. 571 (2019) {https://www.nature.com/articles/s41586-019-1428-4}.

R. Samajdar, PNAS, "Quantum Phases of Rydberg Atoms on a Kagome Lattice," Proc. Natl. Acad. Sci. U.S.A. 118, e2015785118 (2021) {https://www.pnas.org/doi/10.1073/pnas.2015785118}.

J.I. Cirac and P. Zoller, the American Physical Society "Quantum Computations with Cold Trapped Ions," Physical Review Letter, vol. 74, No. 20, (1995) pp. 4091-4094.

T. Monz et al., Physical Review Letters, "Realization of the Quantum Toffoli Gate with Trapped Ions," Phys. Rev. Lett. 102, 040501 (2009) {https://pubmed.ncbi.nlm.nih.gov/19257408/}.

S. Debnath et al., Nature, "Demonstration of a Small Programmable Quantum Computer with Atomic Qubits," vol. 536, pp. 63-66 (2016) {https://pubmed.ncbi.nlm.nih.gov/27488798/}.

A. Kitaev, Annals of Physics, "Anyons in an Exactly Solved Model and Beyond," Phys. vol. 321, Issue 1, (2006), pp. 2-111 {https://www.sciencedirect.com/science/article/abs/pii/S0003491605002381}.

R. Schmied et al., IOP Institute of Physics Quantum Simulation of the Hexagonal Kitaev Model with Trapped Ions, New Journal of Physics 13 115011 (2011) ("Schmied 2011") 23 pp.

R. Schmied, et al., Physical Review Letters, "Optimal Surface-Electrode Trap Lattices for Quantum Simulation with Trapped Ions", Phys Rev. 102, 233002 (2009) ("Schmied 2009") 4 pages.

D.J. Wineland et al., Journal of Research of the National Institute of Standards and Technology, "Experimental Issues in Coherent Quantum-State Manipulation of Trapped Atomic Ions", J. Res. Natl. Inst. Stand. Technol. vol. 103, 259 (1998) pp. 259-328.

C.W. Hogle et al., Sandia National Laboratories "Characterization of Microfabricated Surface Ion Traps," SAND2017 6113C (2017).

C.E. Pearson et al., Physical Review A "Experimental Investigation of Planar Ion Traps," Phys. Rev. A 73, 032307 (2006) {https://journals.aps.org/pra/abstract/10.1103/PhysRevA.73.032307}.

M. Mielenz et al., Nature Communications, "Arrays of Individually Controlled Ions Suitable for Two-Dimensional Quantum Simulations," 711839 (2016) pp. 1-9.

C. Ospelkaus et al., Physical Review Letters, "Trapped-Ion Quantum Logic Gates Based on Oscillating Magnetic Fields," Phys Rev. Lett. 101, 090502 (2008) {https://journals.aps.org/prl/abstract/10.1103/PhysRevLett.101.090502}.

T.P. Harty et al., Physical Review Letters, "High-Fidelity Preparation, Gates, Memory, and Readout of a Trapped-Ion Quantum Bit," Phys Rev. Lett. 113, 220501 (2014) {https://journals.aps.org/prl/abstract/10.1103/ PhysRevLett.113.220501}.

T. Roy, et al., Tata Institute of Fundamental Research, "A Programmable Three-Qubit Superconducting Processor with All-To-All Connectivity," Department of Condensed Matter Physics and Materials Science (2018) pp. 1-11.

M. Storcz, Physics Department, Arnold Sommerfeld Center for Theoretical Physics, and Center for Nanoscience, "Intrinsic Phonon Decoherence and Quantum Gates in Coupled Lateral Quantum-Dot Charge Qubits," Physical Review B 72, 235321 (2005) 10 pages.

D. Stick et al., Nature Physics, "Ion Trap in a Semiconductor Ship" Nature Phys 2, 36-39 (2006) {https://www.nature.com/articles/nphys171}.

P. Maunz, Sandia National Laboratories, "Characterization of a High-Optical-Access Surface Trap Optimized for Quantum Information Processing," SAND2015-1045C (2015).

S.E. Anderson, et al., Physical Review Letters, "Trapping Rydberg Atoms in an Optical Lattice," Phys. Rev. Lett. 107, 263001 (2011) {https://journals.aps.org/prl/abstract/10.1103/PhysRevLett.107.263001}.

I. Bloch, Nature, "Quantum Coherence and Entanglement with Ultracold Atoms in Optical Lattices," Nature 453, 1016-1022 (2008) {https://www.nature.com/articles/nature07126}.

C. E. Bradley et al., Physical Review X, "A 10-Qubit Solid-State Spin Register with Quantum Memory Up to One Minute," Phys. Rev. X 9, 031045 (2019) {https://journals.aps.org/prx/abstract/10.1103/PhysRevX.9.031045}.

M. Saffman et al., Reviews of Modern Physics, "Quantum Information with Rydberg Atoms," Rev. Mod. Phys. 82, 2313 (2010) {https://journals.aps.org/rmp/abstract/10.1103/RevModPhys.82.2313}.

K. Maller et al., Physical Review A, "Rydberg-Blockade Controlled-NOT Gate and Entanglement in a Two-Dimensional Array of Neutral-Atom Qubits," Phys. Rev. A 92, 022336 (2015) {https://journals.aps.org/pra/abstract/10.1103/PhysRevA.92.022336}.

D. Petrosyan et al., Physical Review A, "High-Fidelity Rydberg Quantum Gate Via a Two-Atom Dark State," Phys. Rev. A 96, 042306 (2017) {https://journals.aps.org/pra/abstract/10.1103/PhysRevA.96.042306}.

M. Khazali and K. Molmer, Physical Review X, "Fast Multiqubit Gates by Adiabatic Evolution in Interacting Excited-State Manifolds of Rydberg Atoms and Superconducting Circuits," Phys. Rev. X 10, 021054 (2020) {https://journals.aps.org/prx/abstract/10.1103/PhysRevX.10.021054}.

I. Bloch, Nature Physics, "Ultracold Quantum Gases in Optical Lattices," 1, 23-30 (2005) {https://www.nature.com/articles/nphys138}.

T.M. Graham et al., Physical Review Letters, "Rydberg-Mediated ENtanglement ina Two-Dimensional Neutral Atom Qubit Array," Phys. Rev. Lett. 123, 230501 (2019) {https://journals.aps.org/prl/abstract/10.1103/PhysRevLett.123.230501}.

A Bautista-Salvador et al., "Multilayer ion Trap Technology for Scalable Quantum Computing and Quantum Simulation", 2019 New Journal of Physics, 21 043011 (Year: 2019).

International Search Report and Written Opinion dated Dec. 13, 2023 for International Application No. PCT/US2022/047845 filed Oct. 26, 2022 (7 pages).

Jones C. et al., 'Logical Qubit in a Linear Array of Semiconductor Quantum Dots, Physical review X, Jun. 1, 2018, vol. 8, Issue 2, pp.

(56) References Cited

OTHER PUBLICATIONS 021058-1 to 021058-31. [retrieved Oct. 13, 2023]. Retrieved from [URL: https;//journals.aps. org/prx/abstract/10.1103/PhysRevX.8.021058].

Ravi et al., A Three Dimensional Lattice of Ion Traps, Arxiv.Org, Cornell University Library, 201 Olin Library Cornell University Ithaca, NY 14853, Jul. 27, 2009.

Goel et al., Native multiqubit Toffoli gates on ion trap quantum computers, Arxiv.org, Cornell University Library, 201 Olin Library Cornell University Ithaca, NY 14853, Feb. 28, 2021.

* cited by examiner

SYSTEM AND METHOD USING MULTIPLE ENTANGLED LINEAR QUBIT ARRAYS FOR QUANTUM COMPUTING

CLAIM OF PRIORITY

This application claims priority to U.S. Provisional Appl. No. 63/186,037, filed May 7, 2021, and is a continuation-in-part of U.S. patent application Ser. No. 17/090,747, filed on Nov. 5, 2020, which claims priority to U.S. Provisional Appl. No. 62/933,148 filed on Nov. 8, 2019, and each of these applications is incorporated in its entirety by reference herein.

BACKGROUND

Field

This application is generally directed to quantum computing (QC), and more particularly to quantum computer architectures employing lattice array structures of more than one dimension.

Description of the Related Art

Technology paths toward scalable quantum computing have been diverse. Demonstrated performance in the various figures of merit vary widely according to the type of physical quantum bit (also referred to as a "qubit") employed by each approach. Approaches based on either trapped ions or on superconducting qubits have consistently led the field through more than two decades.

SUMMARY

In certain implementations, a quantum computing (QC) system is provided. The system comprises a plurality of qubits arranged in a plurality of substantially linear regions having longitudinal axes that are substantially parallel to one another. At least some of the substantially linear regions comprise two or more qubits and one or more qubits of each substantially linear region are configured to interact with one or more qubits of at least one other substantially linear region.

Certain implementations disclosed herein provide a quantum computer architecture employing a lattice array structure of more than one dimension for implementing and interconnecting quantum gates in which more than two logical qubits (e.g., each logical qubit comprising one or more physical qubits) can be simultaneously entangled. Certain implementations disclosed herein provide quantum microprocessor configuration and gate array design platforms for quantum processing chips, analogous to field programmable gate arrays (FPGAs) which can advantageously provide a degree of reconfigurability. Certain implementations disclosed herein provide quantum microprocessor configuration and gate array design platforms for quantum processing chips or boards (e.g., electrical and/or optical circuits), analogous to application specific integrated circuits (ASICs) which can advantageously be optimized for a specified application and can advantageously provide custom design flexibility.

Certain implementations disclosed herein comprise lattice configurations comprising multiple fully-connected qubits configurations comprising multiple fully-connected qubits arranged as arrays of three-dimensional (3-D) lattice structures (e.g., cells), with simultaneous multi-qubit gate operations enabled by qubits arrayed in geometric layouts. For example, certain implementations can be configured as multiple one-dimensional (1-D) (e.g., linear) qubit arrays (e.g., rows; columns; lattices; chains) that are substantially parallel to one another. In such examples, the arrays of cells can be analogized to or referred to as 3-D crystal structures. While various implementations are described herein as utilizing trapped ion (e.g., charged atom) qubits (e.g., in microchip structures) to illustrate the nature of quantum interactions to be utilized (e.g., optimized), other implementations can use one or more alternative qubit technologies (e.g., uncharged, Rydberg atom qubits; superconducting qubits) without loss of generality.

Certain implementations disclosed herein provide a quantum computing (QC) system comprising a plurality of qubits arranged substantially in a plurality of linear arrays that are substantially parallel to one another, at least some of the linear arrays comprising two or more qubits and one or more qubits of each linear array configured to interact directly (e.g., to be entangled directly) with one or more qubits of at least one neighboring linear array. For example, the QC system can comprise a multiple-qubit gate array comprising the plurality of qubits arranged as a plurality of multiple-qubit gates positioned in a region between two or more substrates. The qubits of the multiple-qubit gate array can comprise surface electrode traps configured to contain ions (e.g., charged atoms; charged molecules) at or near a surface of at least one of the substrates, and can be arranged substantially in a plurality of linear arrays, with at least some of the qubits of at least one linear array configured to interact (e.g., to be quantum-mechanically entangled) with at least some of the qubits of at least one other (e.g., neighboring) linear array.

BRIEF DESCRIPTION OF THE DRAWINGS

The accompanying drawings, which are incorporated in and constitute a part of this specification, illustrate one or more implementations described herein and, together with the description, explain these implementations.

DETAILED DESCRIPTION

Overview

Figure 1A:
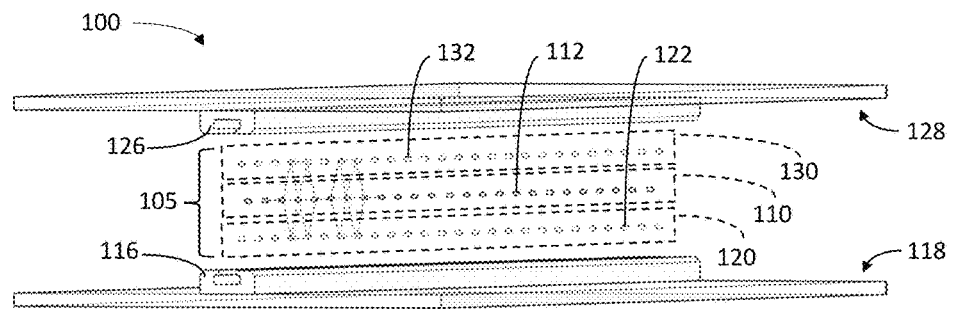
FIG. 1A-1B schematically illustrate a side-angle view and a side view, respectively, of an example QC system comprising a plurality of qubits arranged in a plurality of substantially linear regions in accordance with certain implementations described herein.

Certain implementations of the quantum computing (QC) system described herein advantageously provide a multi-dimensional architecture to enable optimal numbers of qubits to be entangled simultaneously between nearest neighbors and next-nearest neighbors. Certain implementations include electrical and optical access channels for addressing, control, detection, and readout as are needed to engineer scalable quantum processors. Arrays of qubits that are fully connected provide more efficient, flexible choices for executing quantum algorithms in hardware than designs in which entangled gate operations are limited to specific pairs, due to type of qubit employed or their layout. This improved efficiency and flexibility grows rapidly with the number of qubits in an array. Adding a capability to perform gate operations involving more than two qubits at a time can significantly accelerate the efficiency gains over designs limited to one- and two-qubit gates, tens of which can be replaced with one four-qubit gate. Certain implementations described herein use multiple qubit arrays in (e.g., multiple directly connected planar arrays and/or linear arrays) to advantageously avoid problems of one- and two-dimensional geometry configurations (e.g., limits on connectivity; crowding of electrodes needed to control each qubit in a gate, which can greatly extend gate spacing). In certain implementations, multi-dimensional cells of qubits are formed that resemble crystals, such as pyrochlores. In certain implementations, multi-dimensional cells of qubits are reconfigurable and can be formed into various crystal structures according to which nearest neighbor and next nearest-neighbor qubits (e.g., within a cell; across cells; across layers) are entangled for a selected gate operation. Utilizing many qubits to participate per gate can also reduce requirements of circuit depth, error correction and interference mitigation. Interchangeable component cells can enable quantum FPGA (QFPGA) and ASIC (QASIC) layout (e.g., chips).

Certain implementations of the QC system described herein comprise multi-layer configurations comprising multiple fully-connected qubits arranged as arrays of three-dimensional (3-D) lattice structures (e.g., cells) with simultaneous multi-qubit gate operations enabled by qubits arrayed in geometric layouts. For example, multiple linear qubit arrays (e.g., rows; columns; lattices; chains) can be substantially parallel to one another and can form arrays of 3-D cells that can be analogized to or referred to as crystal structures. In certain implementations, the qubits can be suspended (e.g., trapped) equivalently above and below (or over and under; left and right of; etc.) or within multiple co-aligned qubit containment zones (e.g., facing parallel atom trap arrays) to enable optimal coherent connectivity (e.g., entanglement) directly between nearest neighbor qubits, next-nearest neighbor qubits, etc. across multiple array regions without requiring inefficient photonic or other interconnects (e.g., swapping qubits; quantum teleportation) entailing lossy conversions of in situ processing qubits to other species or data bits or significant time delays. Certain such implementations utilize geometrically symmetric cellular structures that provide the capability to perform gate operations involving more than two qubits at a time that can significantly accelerate the efficiency gains over designs limited to one- and two-qubit gates. Certain multi-dimensional implementations can be configured from multiple one-dimensional (1-D) qubit lattice arrays (e.g., linear lattices, columns; chains) that are substantially parallel to one another and that are coaligned (e.g. arrayed about a common longitudinal axis) to form three-dimensional (3-D) arrays configured such that each qubit can directly interact (e.g., can be quantum-mechanically entangled) with at least some of the qubits in more than one dimension (e.g., fully-connected in two or more dimensions at the same time).

While various implementations are described herein according to the physics of trapped ion (e.g., charged atom) qubit approaches, other qubit approaches (e.g., uncharged, Rydberg atom; superconducting qubits) can also be used in accordance with certain implementations described herein without loss of generality.

Certain implementations of the QC system described herein comprise a plurality of multiple-qubit three dimensional (3-D) gate cells, each cell comprising at least three qubits that can be fully connected simultaneously across three dimensions, and a plurality of multiple-qubit cells configured for gate operations of two or more of the multiple-qubit gates. The QC system of certain such implementations can comprise multiple co-aligned qubit containment zones, such as facing parallel ion trap arrays, that enable optimal coherent connectivity or entanglement directly between nearest neighbor qubits, next-nearest neighbor qubits, etc. across multiple array regions without requiring photonic or other interconnects. The multiple-qubit cells can be configured using geometric symmetry to enable multiple-qubit gates to be effected natively, in one gate operation, without reliance on concatenations of multiple one- and two-qubit gates. Leveraging the symmetry of equilateral coupling distances between multiple qubits in a cell enables more than two entangled qubits at a time to perform gate operations that would otherwise require many more qubit gate operations comprising only one- and two-qubit gates.

Certain implementations of the QC system described herein comprise a plurality of qubits arranged substantially in a plurality of linear arrays that are coaligned substantially parallel to one another, at least some of the linear arrays comprising two or more qubits and one or more qubits of each linear array configured to interact with one or more qubits of at least one neighboring linear array. The QC system can comprise a multiple-qubit gate array comprising the plurality of qubits arranged as a plurality of multiple-qubit gates positioned in a region between two or more 1-D lattice array layers (e.g., linear traps; substrates) coaligned about a common longitudinal axis as sides/edges of geometric prisms (e.g., triangular, cubic, pentagonal, hexagonal, septagonal, octagonal, etc.). For example, the qubits of the multiple-qubit gate array can comprise electrode traps configured to contain ions at or near a surface of a substrate or trap region (see, e.g., Stick, D. et al., "Ion Trap in a Semiconductor Chip" Nature Phys 2, 36-39 (2006); Maunz, P. "Characterization of a High-Optical-Access surface trap optimized for quantum information processing," online charts (2015)), and multiple of these substrates or trap regions, can be arranged substantially in a plurality of linear arrays, with at least some of the qubits of at least one linear array configured to interact (e.g., to be quantum-mechanically entangled) with at least some of the qubits of at least one other (e.g., neighboring) linear array.

Certain implementations disclosed herein provide a QC system comprising a plurality of qubits arranged substantially in a plurality of atom trap regions (e.g., 1-D traps; linear surface traps) substantially parallel to one another, and the QC system can further comprise multiple-qubit, 3-D gate arrays comprising the plurality of qubits arranged as a plurality of multiple-qubit gates positioned in regions between and/or within the trap regions. For example, the qubits of the multiple-qubit gate array can comprise 1-D trap arrays configured to contain atomic qubits comprising ions (e.g., charged atoms; charged molecules), neutral atoms (e.g., uncharged atoms, Rydberg states), or other qubit species. For the examples of atomic qubits, atoms are trapped in potential wells, which can be created at or near a surface of at least one of the trap regions or lattices, and can be arranged substantially in a plurality of substantially parallel trap array regions, with at least some of the qubits of at least one 1-D trap array layer configured to interact (e.g., to be quantum-mechanically entangled) directly with at least some of the qubits of at least one other (e.g., neighboring) substantially parallel trap array region.

In each of the implementations of the QC system described herein the symmetric or equilateral coupling geometries of the multiple qubits per cell can enable more complex quantum gates to be performed in a single gate operation and can additionally reduce requirements of circuit depth, error correction and interference mitigation. The interchangeable component cells can enable quantum FPGA (QFPGA) and ASIC (QASIC) layout (e.g., chips) and can be highly reconfigurable.

Certain implementations of the QC system described herein advantageously provide a three-dimensional (3-D) layout of qubits and/or qubit gates that facilitate many more qubits and/or qubit gates being used for computations than are provided using one-dimensional (1-D) layouts. For example, certain implementations described herein provide a 3-D layout of qubit gates, each comprising multiple ions (e.g., more than two simultaneously entangled ions), while providing sufficient spacing to facilitate electrical connections and optical pathways for addressing, manipulation, control, readout, and potential sideband cooling of each qubit, and providing line of sight access angles.

When a particular arrangement or set of qubits allows for any qubit to be quantum mechanically entangled directly with any other qubit in the set, the qubits can be described as being "fully connected." Even a small number of qubits comprising ions that are fully connected in a one-dimensional linear ion trap can demonstrate measurably greater potential processing power than can the same number of qubits that are only pair-wise connected (see, e.g., N. M. Linke et al., "Experimental comparison of two quantum computing architectures", PNAS, Vol. 114, no. 13 (2017)).

Quantum computing (QC) designs demonstrated over the past two decades indicate that the parameters which most affect how quickly a quantum computer can outperform its classical computer counterpart are not based simply on how many qubits are wired together in some fashion. This is exemplified by the greater degree of interest in circuit-model QC hardware, which often has less than one-hundredth of the number of qubits claimed by the leading quantum annealing approach that does not perform a single gate operation. Demonstrated performance of such systems has come down to qubit fidelities (e.g., how precisely the system can perform gate operations), how the qubits are interconnected, and how much overhead is used to allow the qubits to work together to compute solutions to hard problems.

One-qubit gates simply entail flipping a qubit by itself from "0" to "1" or to a special quantum superposition of "0" and "1". Two-qubit gates connect two qubits using superposition combined with quantum entanglement such that anything done to one of the qubits affects the other. In such a two-qubit gate, a target qubit may start out in state "0" or state "1", and can be in any superposition of "0" and "1" (e.g., halfway between "0" and "1"). For example, the function of a quantum controlled-NOT (CNOT) gate is to flip the target qubit if the control qubit is in state "1"; otherwise it does nothing. One- or two-qubit gates can be implemented directly in many different quantum gate-based architectures. For more complex gate operations, implementations that can entangle more than two qubits at once can have a significant impact on the total number of qubits and steps performed to effect the operation and the algorithms that incorporate them (see, e.g., C. Figgatt et al., "Parallel entangling operations on a universal ion-trap quantum computer," Nature, Vol. 571 (2019); Y. Lu et al., "Global entangling gates on arbitrary qubits," Nature, Vol. 571 (2019)). Measurable reductions in the numbers of qubits and steps used up front can, in some instances, lead to dramatic reductions in the overhead for achieving successful outcomes. One example would be a prototype demonstration that could give solutions to otherwise intractable problems without extensive error correction and with fewer ancillas, even part of the time.

Certain implementations described herein use multiple fully connected, high-fidelity qubits. The advantages of such certain implementations (e.g., how much more efficient a particular quantum gate operation can be, as opposed to using combinations of one- and two-qubit gates) can be illustrated by considering an example quantum triply-controlled-NOT ($C^3NOT$) gate comprising four fully connected, high-fidelity qubits. The $C^3NOT$ gate is also called a super-Toffoli gate. In this example $C^3NOT$ gate, three control qubits must all be in a specified state (e.g., "1,1,1") in order to flip a fourth target qubit from "1" to "0". When combined with one or more single-qubit gate operations, such multi-qubit quantum gates can be used to complete a universal set for quantum computing. Multiply-controlled NOT gates are described in reference sources generally as comprising extended series of one- and two-qubit gate operations (see, e.g., M. A. Nielsen and I. L. Chuang, "Quantum Computing and Quantum Information," 1st ed. (Cambridge Univ. Press, 2000)). The extent to which these one- and two-qubit gate series increase even more in physical implementations depends on type of qubits used and on how many qubits can be fully connected and entangled with one another. However, a $C^3NOT$ gate implemented using four fully-connected, multiply-entangled ions at the same time, in an appropriate physical layout, can be configured with a small fraction of the number of the quantum gate operations used in a $C^3NOT$ gate implemented only with one- and two-qubit gates. This can be done by starting with an extension of methods described for implementing the simpler $C^2NOT$ Toffoli gate (see, e.g., J. I. Cirac and P. Zoller, "Quantum Computations with Cold Trapped Ions," Phys. Rev. Lett. Vol. 74 (20) (1995)) and later demonstrated (see, e.g., T. Monz et al., "Realization of the Quantum Toffoli gate with Trapped Ions," Phys. Rev. Lett. Vol. 102, 040501 (2009)). The three-qubit $C^2NOT$ implementation already exhibited a significant reduction in number of contributing gates and time required to complete the full gate operation, while yielding an improvement in net fidelity over the concatenation of one- and two-qubit gates, even if they were of much higher individual fidelities, due to aggregated gate errors. This three-qubit gate can be realized in a single linear trap without a strong requirement for geometric symmetry. In contrast, certain implementations described herein provide $C^nNOT$ gates by exploiting the full 3-D symmetries of the designs described herein. In this way, the improved efficiency example referenced above can be greatly multiplied according to the number of controls in each $C^nNOT$ gate through concomitant reductions in quantum gates needed to implement them. Other multiply-controlled gate operations, including phase rotations, can exhibit similar improvements in efficiency using a physical configuration that involves more than two entangled qubits simultaneously. These improvements up front can greatly reduce error correction.

Even the highest quality qubits exhibit noticeable error rates, which can be small on a per-qubit basis but get multiplied by the number of gates that are used to run an algorithm. When the aggregate error rate reaches a threshold where error correction is required to perform even a small set of quantum operations with reasonable chance of giving a reliable result, the efficiency of the architecture immediately drops in proportion to the amount of overhead used for the error correction.

For a small scale quantum computer having a few hundred relatively high quality qubits intended to perform logic operations, the overhead of error-correction qubits plus ancillas can represent an increase in the number of qubits of one order of magnitude or roughly a factor of ten, with a proportionate decrease in efficiency. For larger scale systems, the overhead can increase further to multiple orders of magnitude. However, in certain implementations described herein, a quantum computer that benefits from aggregate efficiencies of fully-connected, high-quality qubits and employs multi-qubit gate operations (e.g., performed natively by exploiting multi-dimensional geometry) can use significantly fewer steps and significantly fewer total numbers of qubits. As used herein, the term "native" gate operations indicates that more than two qubits can participate at the same time, by virtue of a geometric layout. Certain native multi-qubit gate implementations described herein can advantageously perform algorithms without using extensive error correction overhead. In addition, significant improvements in overall design efficiency, due to reduced overhead, can be achieved, using multiple orders of magnitude fewer quantum resources, both to perform basic quantum computing algorithms or subroutines and to show practical utility with increased speed as compared to classical computing systems.

To date, most QC systems using trapped ions employ one-dimensional (e.g., linear) traps, which can then be interconnected electrically or photonically (see, e.g., U.S. Pat. No. 9,858,531; Debnath et al., "Demonstration of a small programmable quantum computer with atomic qubits," Nature, Vol. 536, p. 63 (2016)). Such 1-D traps enable a linear chain of qubits to be fully connected within a common potential well or trapping zone. The extent of full connectivity is limited by how many qubits can be chained together before the coupling strength between qubits at or near opposite endpoints of the linear chain is too weak to be usable for reliable multi-qubit gate operations, so it can be desirable to create interconnects between multiple linear traps of limited lengths. Optical interconnects, for example, can be employed by transferring a qubit state from an ion to a photon, then sending the photon to another linear trap where the quantum state is transferred to another ion. One type of protocol that is commonly used for such a process is termed "quantum teleportation." Such interconnections impart time delays and potential inefficiencies in the conversions (e.g., from a trapped ion qubit to a photon, and to a second trapped ion). Certain implementations described herein advantageously provide an alternate configuration to optimize more direct qubit-to-qubit interactions simultaneously than can be done efficiently using linear or 2-D elements with optical interconnects. When scaling up to larger numbers of qubits, certain such implementations can advantageously reduce or stave off the number of optical interconnections between nodes with their associated penalties (e.g., time delays; ion-photon conversion losses).

Rectangular two-dimensional (2-D) grid configurations have been previously adopted for some trapped ion approaches, as well as for superconducting qubit (SCQ) schemes. However, the interactions between qubits have been limited to one- and two-qubit operations that occur within the trapped ion grid lanes (e.g., by shuttling qubits in and out of lanes through intersections). Such approaches usually rely on significant redundancy to add the degree of fault tolerance for raising the probability of success in running an algorithm to usable levels. For example, some approaches use global addressing of ensembles of qubits, which are shuttled in and out of aligned intersections in a grid in order to effect a single one- or two-qubit operation redundantly among the many qubits, and then average to reduce errors. The overhead in such an approach, in terms of numbers of redundant qubits for effecting a single logic operation with sufficient fidelity, grows rapidly with the scale of the logic operations to be performed by the quantum computer. Conversely, in certain implementations described herein, entanglement between more than two qubits is enabled by having the qubits arranged in two or more dimensions, to be involved simultaneously and to effect multi-qubit gate operations directly or natively.

The ability to scale up high-fidelity, trapped-ion configurations with high connectivity (e.g., fully connected, many-to-many connections) between nearest neighbor and next-nearest neighbor qubits is limited by the interaction physics between them. For example, coupling strength is highly dependent on the inter-ion distance (d), with the coupling strength or the exchange frequency $\Omega_{ex}$ rolling off as $1/d^3$ as shown in the equation:

$$\Omega_{exch} = \frac{q_1 q_2}{4\pi\varepsilon_0 \sqrt{m_1 m_2 \omega_1 \omega_2}\, d^3}$$

where $\Omega_{exch}$ is the exchange frequency or coupling strength, and for the most general case in which more than one ion species may be used, $q_1$ is the charge of an ion in a first electropotential well, identified here as potential well "1", $q_2$ is the charge of an ion in a second potential well identified here as potential well "2", $m_1$ and $m_2$ are the masses of the ions in potential wells 1 and 2, respectively, $\omega_1$ and $\omega_2$ are the frequencies of potential wells 1 and 2, respectively, and d is the distance between the ions (see, e.g., D. J. Wineland et al., J. Res. Natl. Inst. Stand. Technol. Vol. 103, 259 (1998)). In 2-D layouts, crowding of the surface electrodes for controlling trapped ions for gate operations can arise due to the areas of the multiple surface electrodes and feed lines that provide full control of an ion in its electropotential well, limiting how closely ion trapping zones can be placed together while still allowing for sufficiently strong coupling for effective gate interactions. In 1-D traps to date, up to about 25 ions spaced a few microns apart in a linear chain within a single potential well can be directly coupled and used for effective gate operations, typically in selectable pairwise combinations. Longer ion chains can be formed in the laboratory, but even at only 3-4 micron spacing between qubits, performing effective two-qubit gate operations between ions at opposite ends of a 1-D chain of more than 25 trapped ions in previous work has required resorting to optical or other types of interconnects between separate linear traps. Entanglement between qubits in separate traps is effected by a series of swapping operations, conversions from one qubit type or species to another (e.g., ions to photons and back; different ion species), and/or optical interconnects, however these impart significant time delays and inefficiencies.

Certain implementations described herein advantageously facilitate solutions to additional hardware challenges, which can grow rapidly and appear daunting or infeasible when designing gate-model QC structures that are scaled up from networked or optically interconnected 1-D ion traps. For example, certain implementations described herein integrate optical elements (e.g., lasers; optical ports; fibers; detectors) into the QC structure for addressing, manipulation, readout, and potential sideband cooling of each qubit, and provide line of sight access angles that advantageously enable simultaneous entanglement between multiple qubits across three dimensions.

Certain implementations described herein advantageously provide scalable hardware configurations on which it is possible to directly "write" and run complex quantum algorithms by enabling simultaneous entanglement between optimal numbers of neighboring qubits. In certain implementations, a multidimensional quantum gate implementation, analogous to conventional firmware such as a field programmable gate array (FPGA), can be written directly in the form of multi-qubit gates and reprogrammed flexibly.

Certain implementations described herein advantageously enable multiply controlled quantum gate operations to be run natively by exploiting multi-dimensional geometry. In certain implementations, the quantum gate operations are run on a quantum firmware platform in the least number of steps (e.g., without resorting to concatenations of one- and two-qubit gate operations to effect a multiply controlled NOT operation).

Certain implementations described herein advantageously provide a realizable engineering configuration that enables the quantum firmware platform to be scaled up as needed by integrating electrical and optical channels for full control and readout of each qubit in a circuit-model architecture to enable universal quantum computing.

Certain implementations described herein advantageously provide a multi-layer quantum computing structure configured to enable optimal numbers of qubits to be entangled simultaneously between nearest neighbors, next-nearest neighbors, and potentially beyond. Certain such implementations include electrical and optical access channels for addressing, control, and readout of qubits in scalable quantum processors. For example, arrays of qubits that are fully connected advantageously provide more efficient, flexible choices for executing quantum algorithms in hardware than do other designs in which entangled gate operations are limited to specific pairs (e.g., due to the type of qubit employed or their layout). This improved efficiency and flexibility can grow rapidly with the number of qubits in an array.

Certain implementations described herein are advantageously able to perform gate operations involving more than two qubits at a time, thereby providing significant improvements of efficiency over previous designs that are limited to one- and two-qubit gates (e.g., by replacing tens of such gates with one four-qubit gate). Certain implementations described herein advantageously overcome connectivity limitations found in one- and two-dimensional geometries using trapped ions. For example, arraying qubits in multiple qubit arrays (e.g., multiple coaligned linear qubit arrays) with direct connectivity (e.g., entanglement) between the qubit arrays can solve the problem of significant time delays and inefficiencies of converting from ion qubits to photonic qubits and back again to continue scaling up from the limited number of a few tens of ions in a 1-D chain.

Certain implementations described herein advantageously utilize a first set of ions trapped above a first surface and a second set of ions trapped below a second surface, the second surface facing the first surface and at least some ions of the first set of ions entangled with at least some ions of the second set of ions. By integrating and interleaving the first and second sets of trapped ions and by adjusting the trap position (e.g., height; longitudinal or lateral position) of a central ion of the qubit gate relative to ions at vertices of the qubit gates, certain implementations advantageously provide multi-dimensional entangling geometries that resemble complex 3-D crystal structures (e.g., pyrochlores). In addition, the space between the first and second surfaces of certain implementations advantageously provides optical access from the sides for addressing the qubits globally or locally, as well as optical access for readout by detectors. Since gravity is not the dominant force on trapped ions, the full configuration can be oriented at any angle (e.g., tilted 90 degrees, 45 degrees, etc.). For other types of qubits, this general directional insensitivity of trapped ions may not apply to the same degree, and other types of qubits may confine the choices of orientation.

Example Implementations

Certain implementations described herein utilize multi-dimensional cells of qubits, which can resemble 3-D crystal structures (e.g., pyrochlores). In certain implementations, 3-D cells can be formed symmetrically e.g., in 3-D spaces between the substantially parallel 1-D trapping zones/channels. Certain implementations utilize many qubits per gate, advantageously reducing (e.g., minimizing) circuit depth, error correction, and interference mitigation. Certain implementations utilize interchangeable component cells which can advantageously enable quantum FPGA (QFPGA) and quantum ASIC (QASIC) chips.

While the physical configurations of certain implementations are described herein as using high fidelity trapped ion qubits (e.g., with low error rates), any type of qubit (e.g., naturally occurring; artificially formed) that can be entangled in multiple dimensions simultaneously with multiple other qubits can be used in accordance with certain implementations described herein. Examples of qubits compatible with certain implementations described herein include but are not limited to: subatomic particles; neutral atoms; ions; neutral molecules; charged molecules; Bose-Einstein condensates; electrons; electron holes; excitons; magnetic qubits; nitrogen-vacancy centers in diamond; phonons; photons; quantum dots; Rydberg atoms; spins in silicon; and possibly superconducting qubits. In certain implementations, the qubits are suitable to effect gate operations directly (e.g., natively), between more than two qubits in the specified configuration. For example, the physical architecture of certain implementations can advantageously provide complex gate operations directly, such as a multiply-controlled NOT or phase rotation, without resorting to serial concatenations of one- and two-qubit gates.

The trapped ion qubits utilized in certain implementations described herein, illustrate the nature of quantum interactions to be optimized. Germane figures of merit that trapped ions exhibit include but are not limited to: (i) the fact that they are identical within a given species and therefore extensive calibration or tuning can advantageously be avoided, (ii) the ability to form qubits that have very long-lived stability, and (iii) continued, demonstrated high fidelity gate operations as compared to competing qubit technologies. In certain implementations described herein, simultaneous multi-qubit gate operations can be enabled by ions arrayed in 3-D geometric layouts of multiple identical, fully-connected qubits. In certain implementations, 3-D geometric layouts of fully-connected qubits can advantageously integrate more than one qubit type (e.g., employ ions of one species for the multiple control qubits and a second ion species as a target; employ different ion species for neighboring cells).

Linear (1-D) surface trap qubits (e.g., ions) typically are trapped in electropotential wells designed to be centered at distances of a few tens of microns from electrode surfaces. Distances of the qubits from the electrodes as well as movement and placement of individual qubits linearly along the trap's long axis can be controlled by voltages applied to the DC and RF electrodes comprising the trap region (see, e.g., Stick 2006). DC voltages, RF frequency and/or other electrical settings can be adjusted to optimize quantum gate performance including minimizing errors due to noise (e.g., due to heating, RF interference, stray fields) in accordance with specific properties of the qubit (e.g., mass of the ion species selected). Another electropotential well or RF null region (sometimes referred to as "ancillary" or "serendipitous") can form at roughly twice the distance from each surface (e.g., substrate) (see, e.g., M. Mielenz et al., "Arrays of individually controlled ions suitable for two-dimensional quantum simulations," Nature Communications, 7:11839 (2016)) and has been used as a loading zone. In certain implementations, the substrate region comprises a portion of an electrical insulator and/or semiconductor (e.g., silicon oxide; silicon) chip, and at least some of the electrical traces can be in electrical communication with the electrodes of the electrode region. At least some of the other electrical traces can be in electrical communication with the electrodes of the electrode regions of portions of other neighboring qubits. For example, the electrical traces and the electrodes within the electrode region can comprise electrically conductive material (e.g., aluminum; copper; gold) deposited onto a surface of the substrate region, and can comprise at least one hermetic coating configured to hermetically seal the electrically conductive material from contaminants and/or corrosion. The electrodes of the electrode region can be configured to generate the electropotential well which is configured to contain (e.g., suspend; trap) single ions or a linear chain of ions at a position spaced away from the planar substrate region (e.g., in a direction substantially perpendicular to the substrate region).

FIGS. 1A-4D schematically illustrate various aspects of example multiple-qubit gates formed between 1-D linear trap regions and using electropotential wells to trap ions that are entangled with other trapped ions in accordance with certain implementations described herein. Vertical orientation is not required, so the terms "top" and "bottom" are not used. In certain implementations described herein, multiple linear trapping regions are coaligned such that one or more qubits from a first trapping region can interact directly (e.g., be entangled) with one or more qubits in a second, third, fourth, fifth, sixth, seventh, etc. coaligned trapping region and/or with qubits in other coaligned trapping regions at the same time. In certain implementations described herein, serendipitous (e.g., ancillary) trapping zones can be used as an additional intended trapping region for gate operations with appropriate adjustments as needed; for optimal distance from the trapping electrodes, for linear displacement placement along a trap's long axis to enable interleaving of qubits between prism lattice layers (e.g., into triangular prism lattices; cubic prism lattices; pentagonal prism lattices; hexagonal prism lattices, etc.), and for optimal motional stability.

In certain implementations, a quantum computing (QC) system comprises a plurality of qubits arranged in a plurality of substantially linear regions having longitudinal axes that are substantially parallel to one another, at least some of the substantially linear regions comprising two or more qubits and one or more qubits of each substantially linear region configured to interact with one or more qubits of at least one other substantially linear region. For example, the plurality of substantially linear regions can comprise a central linear region having a central longitudinal axis along which central qubits of the central linear region are arranged. The plurality of substantially linear regions can further comprise at least one outer linear region having a corresponding outer longitudinal axis along which outer qubits of the outer linear region are arranged.

In certain implementations, the at least one outer substantially linear region comprises at least two outer substantially linear regions each having a corresponding outer longitudinal axis along which the outer qubits of the outer substantially linear region are arranged. The central longitudinal axis can be spaced from and substantially parallel to each of the outer longitudinal axes, with each of the outer longitudinal axes at a different azimuthal position about the central longitudinal axis. The outer linear regions can be formed from the electropotential wells closest to the corresponding electrode surfaces and the central linear region can be formed from the serendipitous trapping zones or RF null regions corresponding to the electropotential wells forming the outer linear regions, with the alignment and spacing of the outer linear regions designed so that their corresponding serendipitous trapping zones or RF null regions overlap (e.g., at the center of a symmetric alignment of parallel linear regions). For example, each of the outer longitudinal axes can be spaced substantially equidistant from and parallel to a common (e.g., overlapping) central longitudinal axis and the centerlines of respective outer longitudinal axes can be symmetrically arranged (e.g., at equal azimuthal angles) about the common central longitudinal axis to form either a 2-D plane or a 3-D geometric prism.

For example, two outer longitudinal axes can be separated from one another by an azimuthal angle of approximately 180 degrees about the central longitudinal axis (e.g., two outer linear regions with two outer longitudinal axes on opposite sides of the central longitudinal axis and coplanar with the central longitudinal axis). For other examples, three outer longitudinal axes can be separated from one another by an azimuthal angle of approximately 120 degrees about the central longitudinal axis (e.g., three outer linear regions with three outer longitudinal axes), four outer longitudinal axes can be separated from one another by an azimuthal angle of approximately 90 degrees or approximately 180 degrees about the central longitudinal axis (e.g., four outer linear regions with four outer longitudinal axes), five outer longitudinal axes can be separated from one another by an azimuthal angle of approximately 72 degrees or approximately 144 degrees about the central longitudinal axis (e.g., five outer linear regions with five outer longitudinal axes), six outer longitudinal axes can be separated from one another by an azimuthal angle of approximately 60 degrees, approximately 120 degrees, or approximately 180 degrees about the central longitudinal axis (e.g., six outer linear regions with six outer longitudinal axes).

Figure 1B:
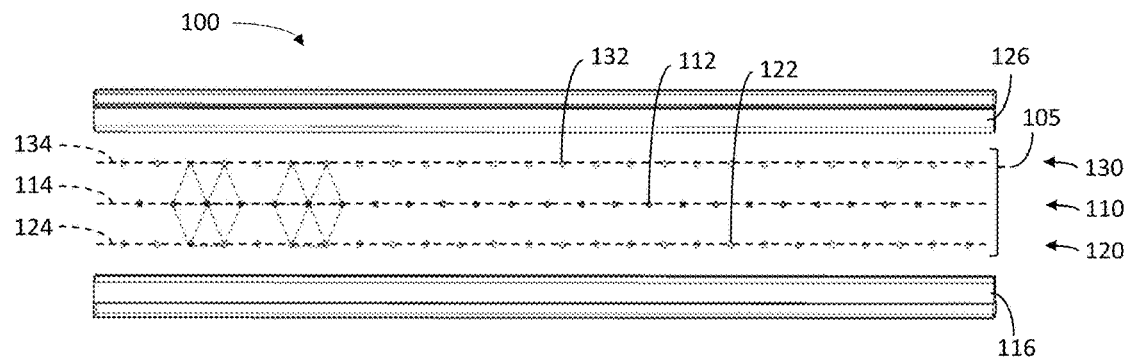
Figure 1C:
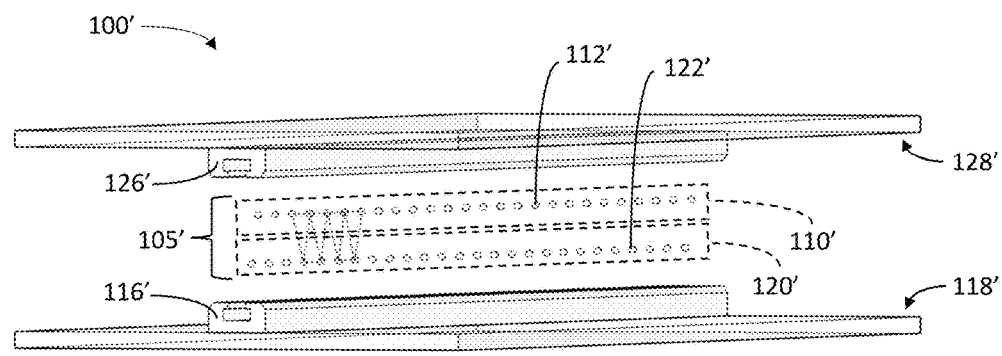
FIG. 1C schematically illustrates a side-angle view of another example QC system 100' comprising a plurality of qubits 105' arranged in a plurality of substantially linear regions in accordance with certain implementations described herein.

FIG. 1A-1B schematically illustrate a side-angle view and a side view, respectively, of an example QC system 100 comprising a plurality of qubits 105 arranged in a plurality of substantially linear regions in accordance with certain implementations described herein. FIG. 1C schematically illustrates a side-angle view of another example QC system 100' comprising a plurality of qubits 105' arranged in a plurality of substantially linear regions in accordance with certain implementations described herein.

The plurality of qubits 105 of FIGS. 1A-1B are grouped into multiple groups: a central group of qubits 112 arranged in a central substantially linear region 110, a first outer group of qubits 122 arranged in a first outer substantially linear region 120, and a second outer group of qubits 132 arranged in a second outer substantially linear region 130. As shown in FIGS. 1A-1B, in the first outer substantially linear region 120, the first outer group of qubits 122 (e.g., in a first outer qubit-trapping zone) are arranged in a substantially linear chain above a first substantially linear surface trap 116 of a first substrate 118, and the second outer group of qubits 132 (e.g., in a second outer qubit-trapping zone) are arranged in a substantially linear chain substantially parallel to the first outer region 120 and below a second substantially linear surface trap 126 of a second substrate 128. The central group of qubits 112 are arranged in a substantially linear chain substantially parallel to the first outer region 120, and between the first outer region 120 and the second outer region 130. The central substantially linear region 110 comprises a serendipitous trapping region generated by the first and second substantially linear surface traps 116, 126.

The plurality of qubits 105' of FIG. 1C are grouped into one group of qubits 112' arranged in a substantially linear chain in a substantially linear region 110' and another group of qubits 122' arranged in a substantially linear chain in a substantially linear region 120' substantially parallel to the substantially linear region 110'. As shown in FIG. 1C, both groups of qubits 112', 122' are between a substantially linear surface trap 116' of a first substrate 118' and a second substantially linear surface trap 126' of a second substrate 128'. The substantially linear region 110' comprises a primary trapping region generated by the surface trap 126' and an overlapping serendipitous trapping region generated by the surface traps 116', and the substantially linear region 120' comprises a primary trapping region generated by the surface trap 116' and an overlapping serendipitous trapping region generated by the surface traps 126'.

In certain implementations, the plurality of qubits 105, 105' comprise ions that are confined (e.g., trapped) within corresponding electropotential wells generated by voltages applied to electrodes of the surface traps 116, 126, 116', 126'. Examples of ions compatible with certain implementations described herein include but are not limited to: $Ba^+$; $Be^+$; $Cd^+$; $Ca^+$; $Mg^+$; $Hg^+$; $Sr^+$; $Yb^+$. In certain other implementations, alternative qubit technologies, such as uncharged atoms (e.g., neutral atoms, Rydberg states) can be used.

FIGS. 1A-1B illustrate an example configuration of linear chains of qubits 105 at least partially confined by the linear traps (e.g., 1-D traps) that are coaligned and arrayed into gates of multiple simultaneously-entangled qubits across three dimensions and can uniquely enable multiply-controlled gate operations natively (e.g., by exploiting geometric symmetry). The configuration of FIGS. 1A-1B can be conceptualized by starting with the two example linear surface traps 116, 126 as building blocks. By inverting one of the linear surface traps 116, 126 over the other as shown in FIGS. 1A-1B and suspending the linear chain of ions in the designed electropotential well nearest each linear trap 116, 126, the ions in each chain (e.g., qubits 122, 132) can be arranged to interact (e.g., be entangled) both with other ions within the same chain and with ions in an adjacent chain. In certain implementations described herein, the distances between the coaligned outer linear regions 120, 130 can be advantageously adjusted such that a "serendipitous" trapping zone or RF null, naturally occurring at roughly twice the distance from the linear surface trap 116 as the first outer (e.g., engineered) trapping zone or RF null, overlaps with another "serendipitous" trapping zone or RF null that naturally occurs at roughly twice the distance from the linear surface trap 126 as the second outer (e.g., engineered) trapping zone or RF null. In certain implementations, these overlapping serendipitous zones can be utilized to form the central linear region 110 (e.g., a middle or central linear trapping region) adjacent to and approximately equidistant from the first outer and second outer linear regions 120, 130 (e.g., trapping zones). In certain implementations, the two outer longitudinal axes 124, 134 of the first outer and second outer linear regions 120, 130 are separated from one another by an azimuthal angle of 180 degrees about the central longitudinal axis 114 of the central linear region 110 (e.g., the first outer and second outer linear regions 120, 130 having the two outer longitudinal axes 124, 134 on opposite sides of the central longitudinal axis 114 and coplanar with the central longitudinal axis 114).

In certain implementations described herein, additional electrodes and/or voltage adjustments can be incorporated for added control and stability depending on the intended quantum gate operations (e.g., for multi-qubit gates) to be performed on the qubits between the central, first outer, and second outer linear regions 110, 120, 130. In certain implementations described herein, appropriate adjustments for linear displacement placement of qubits trapped above (and below) along a trap's long axis enable interleaving of qubits between layers into a triangular lattice to enable equilateral triangular, hexagonal and other symmetric nearest-neighbor entanglement connections to be formed advantageously in two dimensions, or in more than two dimensions (e.g., as shown in FIGS. 2A-2E, 3A-3C, 4A-4D), for the purpose of performing multiply-controlled quantum gate operations natively that involve more than two qubits entangled simultaneously across more than two dimensions. For example, FIGS. 1A-1B show two connected 7-qubit hexagonal cells as one example that optimizes nearest neighbor connectivity as two $C^6NOT$ gates connected in a plane.

In certain implementations described herein, the QC system 100 comprises three or more linear surface traps to form 3-D configurations. In these 3-D configurations, the linear regions closest to each of the three or more linear surface traps are substantially parallel to one another and the serendipitous linear regions of the three or more linear surface traps are coaligned (e.g., colinear) with one another, forming a single central linear trapping region that is adjacent to the outer linear regions closest to each of the three or more linear surface traps (e.g., with longitudinal axes at different azimuthal positions relative to the longitudinal axis of the central linear trapping region). As described herein, the azimuthal angles between the longitudinal axes of the neighboring outer linear trapping regions can be adjusted to form geometric prisms for added control and stability of the central linear trapping region (e.g., the serendipitous trapping zones of the linear surface traps), depending on the intended quantum gate operations (e.g., for multi-qubit gates) to be performed on qubits of the multiple linear trapping regions.

Figure 2A:
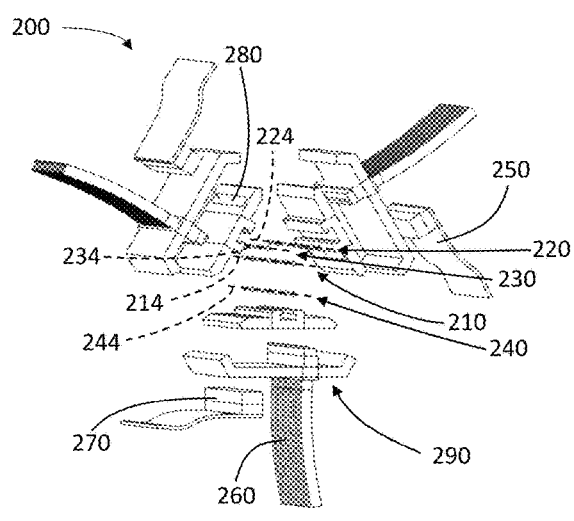
FIGS. 2A-2B schematically illustrate exploded perspective and side views, respectively, and FIGS. 2C-2D schematically illustrate assembled perspective and side views, respectively, of an example triangular prism array in accordance with certain implementations described herein.
Figure 2B:
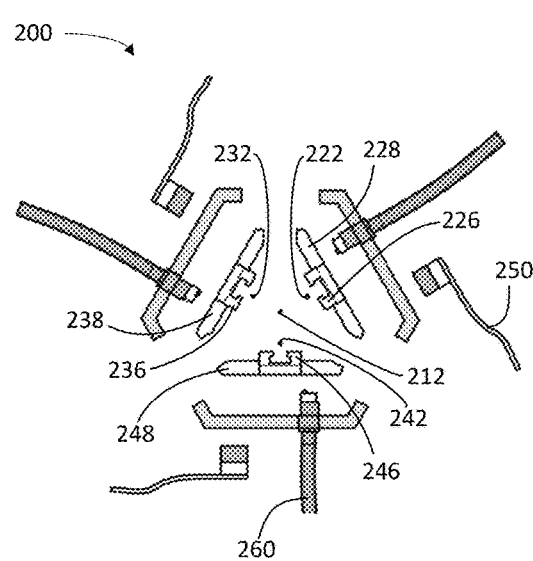
Figure 2C:
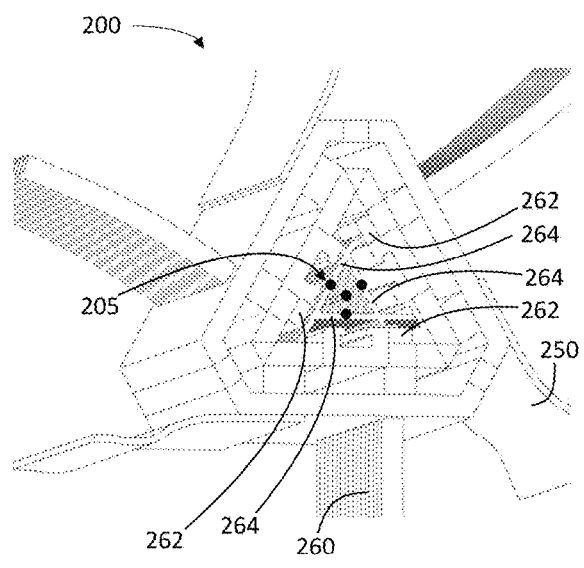
FIG. 2E schematically illustrates four linear chains of coupled qubits of the example triangular prism array of FIGS. 2A-2D in accordance with certain implementations described herein.
Figure 2D:
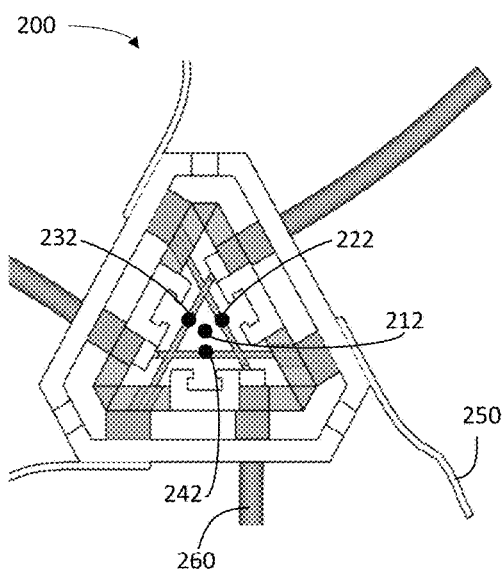
Figure 2E:
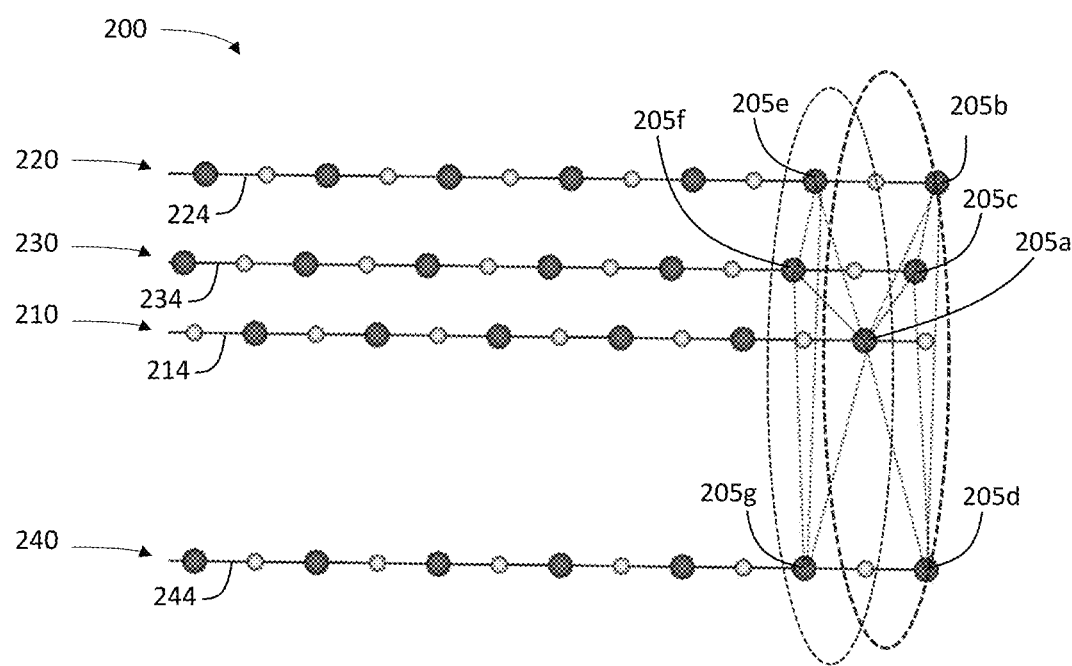

FIGS. 2A-2B schematically illustrate exploded perspective and side views, respectively, and FIGS. 2C-2D schematically illustrate assembled perspective and side views, respectively, of an example triangular prism array 200 in accordance with certain implementations described herein. The example triangular prism array 200 comprises a plurality of qubits 205 in a plurality of substantially linear regions comprising a central linear region 210 (e.g., a central trapping region comprising a central group or chain of qubits 212) having a central longitudinal axis 214. The example triangular prism array 200 further comprises three outer linear regions 220, 230, 240 (e.g., three outer trapping regions each comprising a corresponding outer group or chain of qubits 222, 232, 242, the three outer trapping regions adjacent to the central linear region 210) having outer longitudinal axes 224, 234, 244 that are substantially parallel to one another and to the central longitudinal axis 214. Each of the substantially linear regions 210, 220, 230, 240 comprises two or more qubits 205 configured to interact with one another and with one or more qubits 205 of at least one other substantially linear region 210, 220, 230, 240. The qubits 205 are at least partially confined within the linear regions 210, 220, 230, 240 by electropotential wells generated by three linear (e.g., 1-D) traps 226, 236, 246 in accordance with certain implementations described herein.

In the example triangular prism array 200 of FIGS. 2A-2D, added control and stability of a linear chain of qubits 205 along the central trapping region 210 is provided by overlapping the serendipitous RF nulls from each of the three outer linear traps 226, 236, 246 to be approximately equidistant from each of three outer linear traps 226, 236, 246. The inner angle (e.g., azimuthal angle) between any two outer linear traps 226, 236, 246, with the central trapping zone 210 as the vertex, equals approximately 60 degrees, forming a triangular prism (e.g., that can be substantially equilateral in cross section or substantially isosceles in cross section). In certain implementations, the triangular prism array 200 enables $C^3NOT$ gates along the transverse direction (e.g., substantially perpendicular to the central longitudinal axis 214) and connecting them axially to form $C^6NOT$ gates. Multiple such gates can be formed and connected along the central longitudinal axis 214.

FIGS. 2A-2D schematically illustrate example placements of the substrates 228, 238, 248 and the linear surface traps 226, 236, 246 (e.g., containing RF and DC electrodes) along with data cables 250, optical fibers 260, optical detectors 270, linear trap zones 210, 220, 230, 240, groups (e.g., chains) of qubits 212, 222, 232, 242, optical (e.g., laser light) exit ports 280 and supporting outer structures 290 in accordance with certain implementations. In addition, FIGS. 2C-2D schematically illustrate example positions of addressing laser output ports 262 at the ends of optical fibers 260 that bring multiple tuned wavelengths of laser light (e.g., from acousto-optic modulators; not shown) for selective qubit addressing, emitting laser beams 264 and four coupled (e.g., entangled) qubits 205a,b,c,d (e.g., one qubit from each of the four chains 212, 222, 234, 242) used to form a $C^3NOT$ gate. In certain implementations, the four coupled qubits 205a,b,c,d can also be coupled (e.g., entangled) directly to three additional adjacent qubits 205e, f,g (e.g., neighboring vertex qubits) along the triangular prism array 200, as illustrated schematically in FIG. 2E, to form a $C^6NOT$ gate that shares a target qubit 205a (e.g., at the center) in accordance with certain implementations described herein. The alternate shading on the qubits indicates that there can be two interleaved species (e.g., two different ion species), in which one ion can be sympathetically cooled by a neighboring ion which is laser cooled. Since the sympathetically cooled ion is not impinged by the cooling laser beam, the sympathetically cooled ion can form gate operations with fewer interference, noise, or timing issues. The dotted ovals of FIG. 2E denote a transverse plane of two sets of vertex ions that can combine with the shared target ion to create a $C^6NOT$ gate from two potential $C^3NOT$ gates of the shared target ion.

In certain implementations, the three qubits 205b,c,d form a triangle (e.g., an equilateral triangle) of "control" qubits (e.g., the spacing between any two of the qubits can be in a range of 30 microns to 70 microns), with the triangle substantially perpendicular to the longitudinal axes 214, 224, 234, 244 of the linear substrate regions 210, 220, 230, 240. The three qubits 205b,c,d of the triangle are an example of three qubits arranged in a substantially planar region and configured to interact (e.g., be entangled) simultaneously with one another and also to interact collectively with or upon a fourth central (e.g., target) qubit 205a, to perform multi-qubit gate operations natively (e.g., geometrically, symmetrically) in one effective gate operation in accordance with certain implementations described herein.

In certain implementations, as shown in FIGS. 2C-2D, the multi-qubit trap configurations have a substantially triangular cross-section in a plane substantially perpendicular to the longitudinal axes 214, 224, 234, 244, while in certain other implementations, the multi-qubit trap configurations have other shapes (e.g., square, rectangular; pentagonal, hexagonal, septagonal, octagonal, etc.; circular, oval; geometric; non-geometric; symmetric; non-symmetric).

Figure 3A:
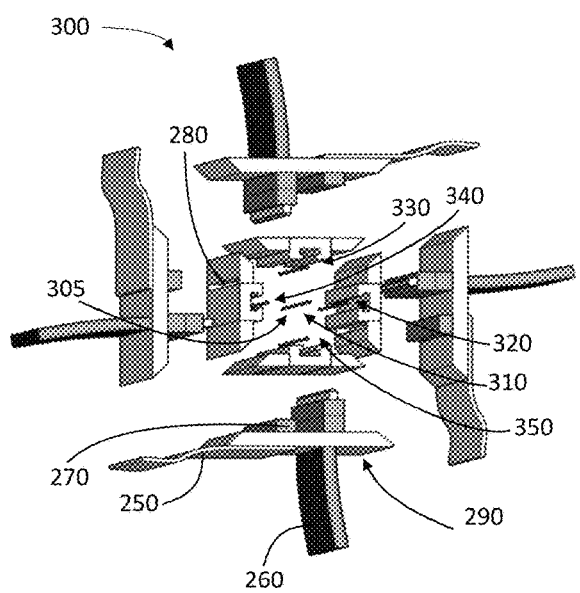
FIG. 3A schematically illustrates an exploded perspective view and FIGS. 3B-3C schematically illustrates an assembled perspective view of an example cubic prism array in accordance with certain implementations described herein.
Figure 3B:
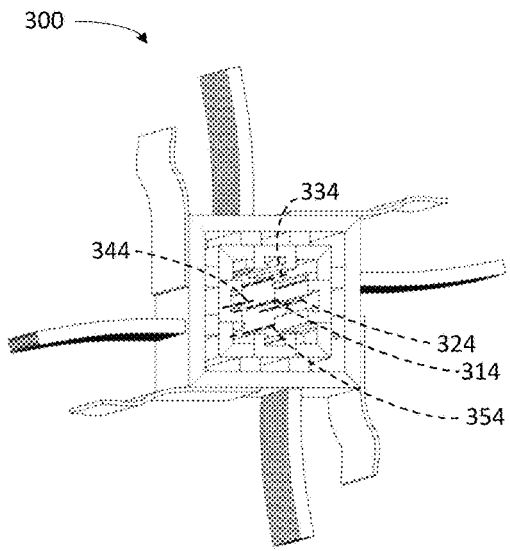
Figure 3C:
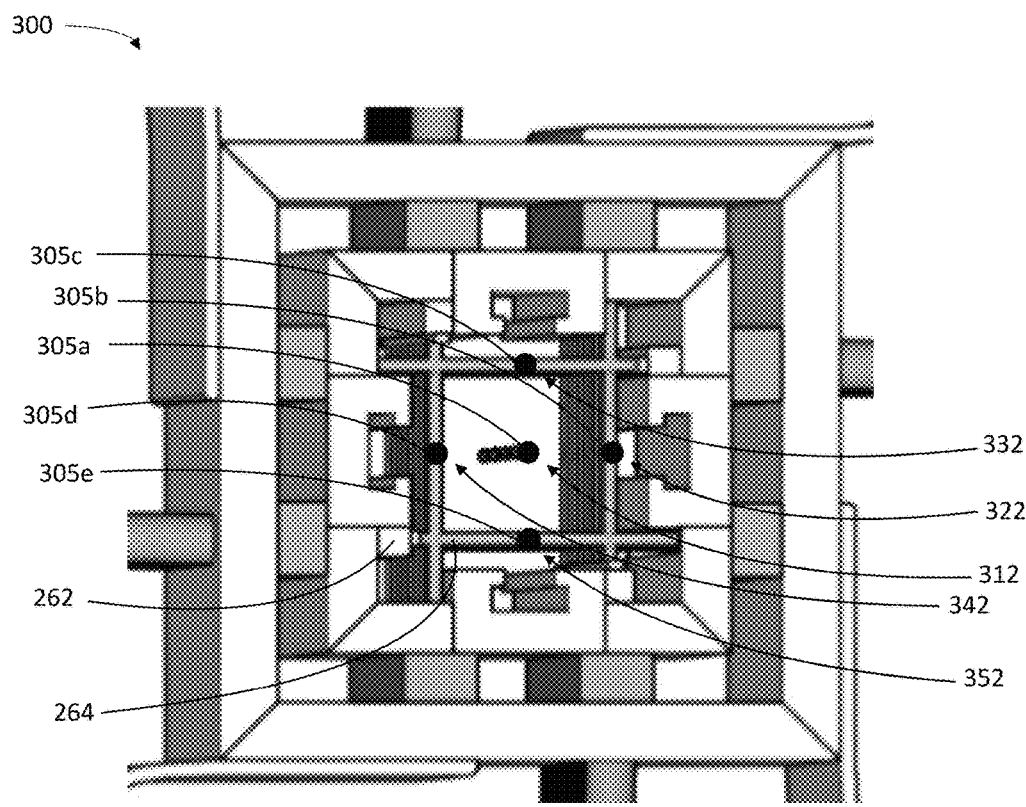

FIG. 3A schematically illustrates an exploded perspective view and FIGS. 3B-3C schematically illustrate an assembled perspective view of an example cubic (e.g., rectangular; square) prism array 300 in accordance with certain implementations described herein. The example cubic prism array 300 comprises a plurality of qubits 305 in a plurality of substantially linear regions comprising a central linear region 310 (e.g., a central trapping region comprising a central group or chain of qubits 312) having a central longitudinal axis 314. The example cubic prism array 300 further comprises four outer linear regions 320, 330, 340, 350 (e.g., four outer trapping regions each comprising a corresponding outer group or chain of qubits 322, 332, 342, 352, the four outer trapping regions adjacent to the central linear region 310) having outer longitudinal axes 324, 334, 344, 354 that are substantially parallel to one another and to the central longitudinal axis 314. Each of the substantially linear regions 310, 320, 330, 340, 350 comprises two or more qubits 305 configured to interact with one another and with one or more qubits 305 of at least one other substantially linear region 310, 320, 330, 340, 350. The qubits 305 are at least partially confined within the linear regions 310, 320, 330, 340, 350 by electropotential wells generated by four linear (e.g., 1-D) trap regions in accordance with certain implementations described herein.

In the example cubic prism array 300 of FIGS. 3A-3C, added control and stability of a linear chain of qubits 305 along the central linear region 310 (e.g., added as compared to the control that may be provided by a single serendipitous RF null) is provided by overlapping the serendipitous RF nulls from each of the four outer linear traps to be approximately equidistant from each of the four outer linear traps. The inner angle (e.g., azimuthal angle) between any two outer linear traps, with the central linear zone 310 as the vertex, equals approximately 90 degrees, forming a cubic prism that is substantially equilateral in cross section.

FIGS. 3A-3C schematically illustrate example placements of the substrates and the linear surface traps (e.g., containing RF and DC electrodes) along with data cables 250, optical fibers 260, optical detectors 270, linear regions (e.g., trap zones) 310, 320, 330, 340, 350, groups (e.g., chains) of qubits 312, 322, 332, 342, 352, optical (e.g., laser light) exit ports 280 and supporting outer structures 290 in accordance with certain implementations described herein. In addition, FIGS. 3B-3C schematically illustrate example positions of addressing lasers 262 emitting laser beams 264 and five coupled (e.g., entangled) qubits 305a,b,c,d,e (e.g., one qubit from each of the five chains 312, 322, 332, 342, 352) used to form a $C^4$NOT gate. In certain implementations, the five coupled qubits 305a,b,c,d,e can also be coupled (e.g., entangled) directly to four additional adjacent qubits 305 (e.g., neighboring vertex qubits) along the cubic prism structure 300 to form a $C^8$NOT gate that shares a target qubit 305a (e.g., at the center) in accordance with certain implementations described herein.

Figure 4A:
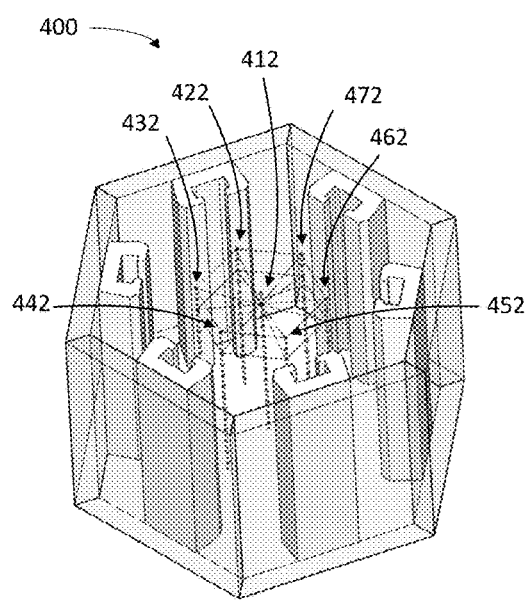
FIGS. 4A-4B schematically illustrate two perspective views of an example hexagonal prism array in accordance with certain implementations described herein.
Figure 4B:
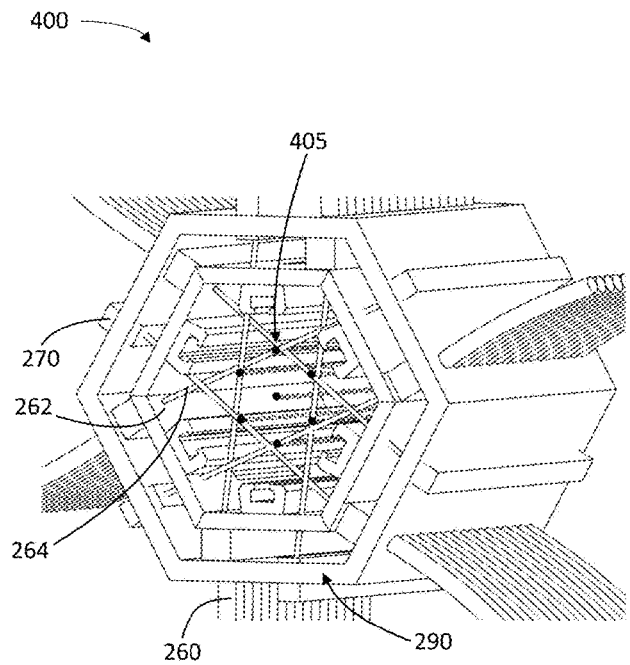

FIGS. 4A-4B schematically illustrate two perspective views of an example hexagonal prism array 400 in accordance with certain implementations described herein. The example hexagonal prism array 400 comprises a plurality of qubits 405 in a plurality of substantially linear regions comprising a central linear region (e.g., a central trapping region comprising a central group or chain of qubits 412) having a central longitudinal axis. The example hexagonal prism array 400 further comprises six outer linear regions (e.g., six outer trapping regions each comprising a corresponding outer group or chain of qubits 422, 432, 442, 452, 462, 472, the six outer trapping regions adjacent to the central linear region) having outer longitudinal axes that are substantially parallel to one another and to the central longitudinal axis. Each of the substantially linear regions comprises two or more qubits 405 configured to interact with one another and with one or more qubits 405 of at least one other substantially linear region. The qubits 405 are at least partially confined within the linear regions by electropotential wells generated by six linear traps (e.g., 1-D surface traps) in accordance with certain implementations described herein.

In certain implementations, the hexagonal prism array 400 comprises $C^n$NOT gates each comprising 13 qubits 405 or more. For example, FIG. 4A schematically illustrates example placements of the substrates and the linear surface traps (e.g., containing RF and DC electrodes) along with a depiction of the entanglement of 13 qubits 405 at one end of the hexagonal prism array 400 (e.g., which illustrates the formation of a 'Pyrochlore' $C^{12}$NOT gate) in accordance with certain implementations described herein. FIG. 4B schematically illustrates the example hexagonal prism array 400 comprising six linear traps (e.g., 1-D surface traps) to form the six-sided prism structure illustrated, including addressing laser output ports 262 at the ends of optical fibers 260 that bring multiple tuned wavelengths of laser light (e.g., from acousto-optic modulators; not shown), emitting laser beams 264, along with data cables, optical fibers 260, optical detectors 270, linear trap zones, qubit groups (e.g., chains) 412, 422, 432, 442, 452, 462, 472, optical (e.g., laser light) exit ports, and supporting outer structures 290 (e.g., which can be omitted if other structures are sufficiently rigid). The example of seven qubits 405 (e.g., ions) schematically illustrated by FIGS. 4A-4B can be entangled to form a $C^6$NOT gate which can also be coupled directly to six adjacent vertex qubits in a substantially parallel lattice layer along the longitudinal axes of the hexagonal prism array 400 to form $C^{12}$NOT gates, and these gates can further be coupled directly to six other adjacent qubits 405 (e.g., vertex qubits) in a substantially parallel lattice layer along the hexagonal prism array 400 to form $C^n$NOT comprising more than two layers (e.g., $C^{18}$NOT, etc. which can be referred to as "Super Pyrochlore" gate cells) gates in accordance with certain implementations described herein.

Figure 4C:
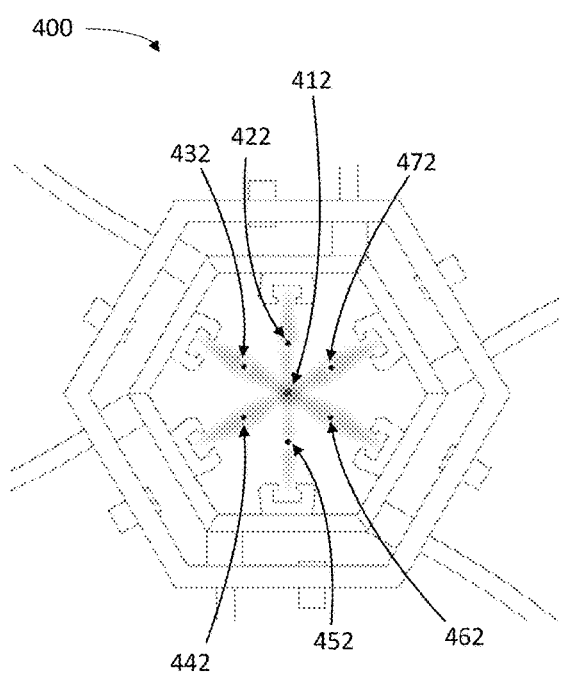
FIG. 4C schematically illustrates a cross-sectional view of an example hexagonal prism array having a plurality of single logical qubits each comprising a single physical qubit in the central linear region and pluralities of single logical qubits each comprising a single physical qubit in the outer linear regions in accordance with certain implementations described herein.
Figure 4D:
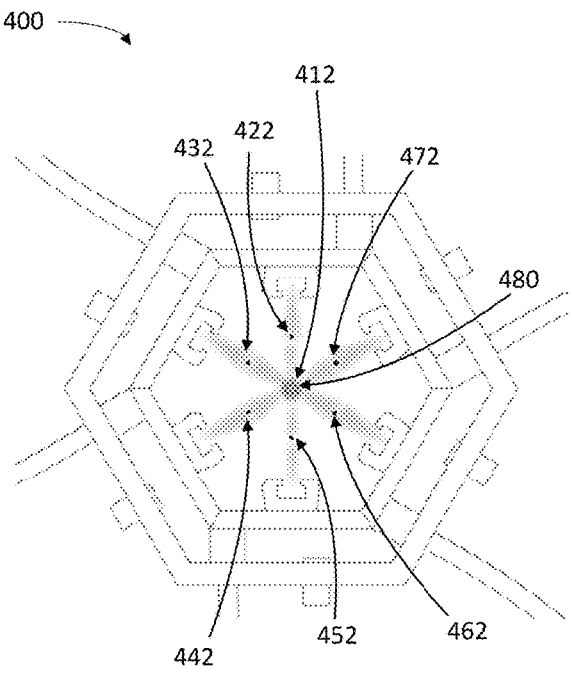
FIG. 4D schematically illustrates a cross-sectional view of an example hexagonal prism array having a plurality of single logical qubits each comprising a cluster of six physical qubits in the central linear region and pluralities of single logical qubits each comprising a single physical qubit in the outer linear regions in accordance with certain implementations described herein.
Figure 5A:
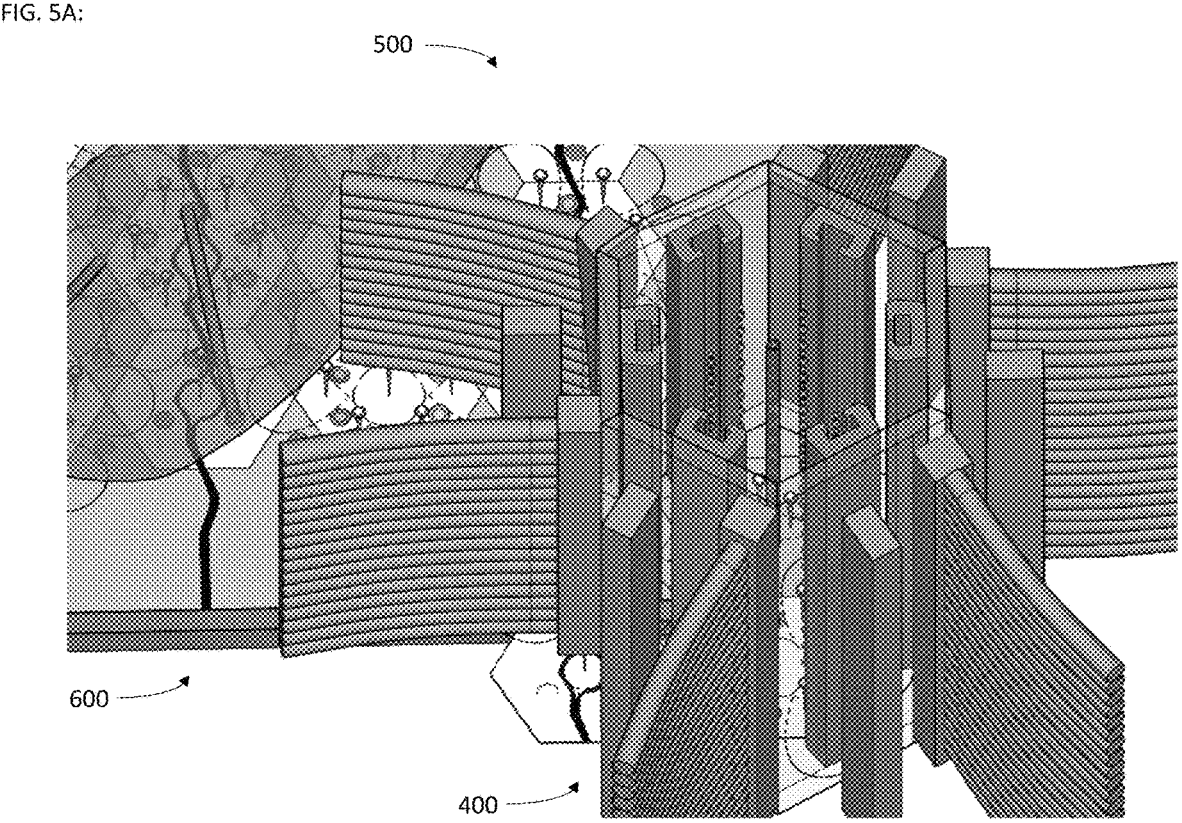
FIG. 5A-5D schematically illustrate an example system comprising at least one hexagonal prism array with an example QC structure in accordance with certain implementations described herein.
Figure 5B:
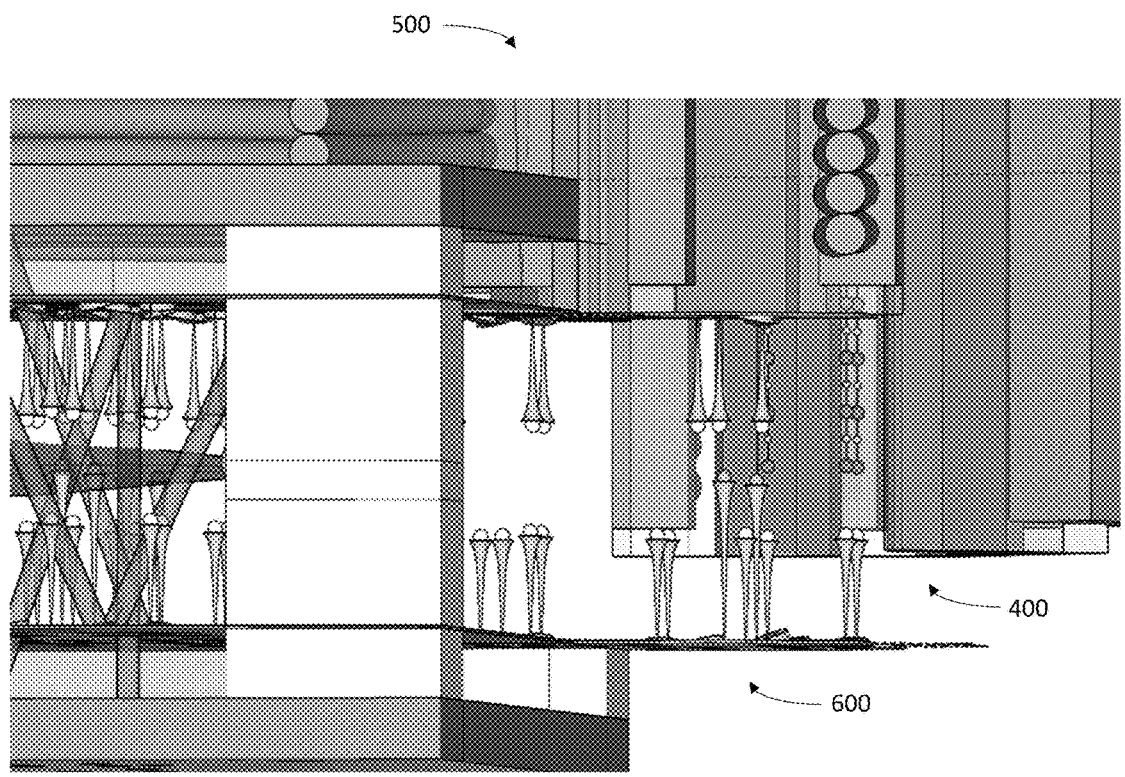
Figure 5C:
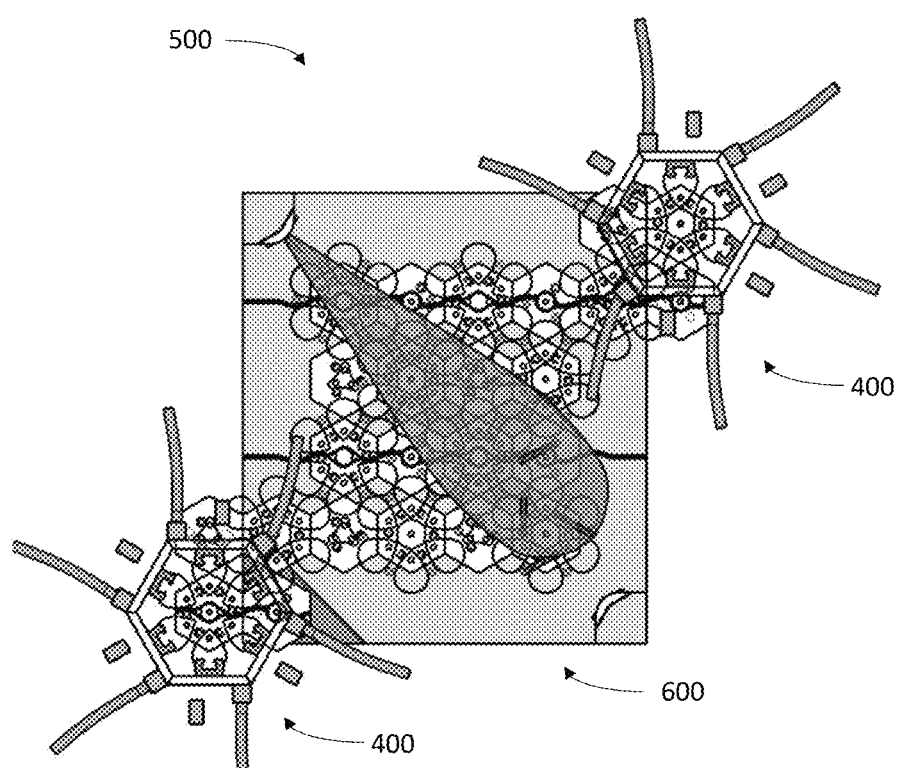
Figure 5D:
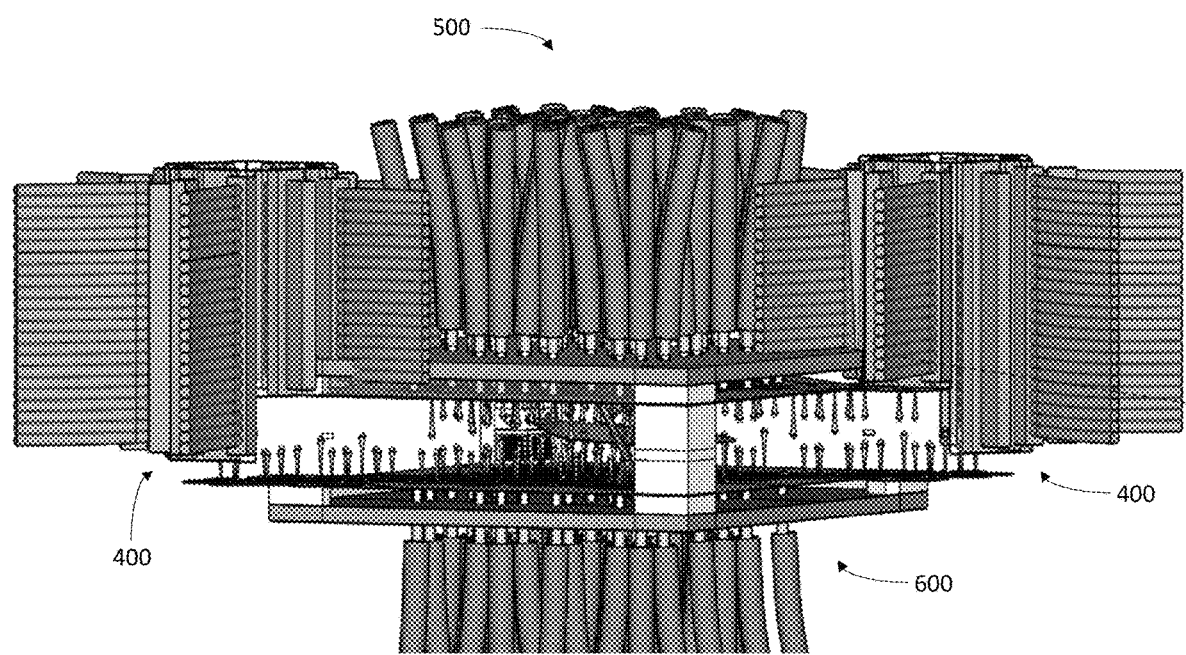

FIG. 4C schematically illustrates a cross-sectional view of an example hexagonal prism array 400 having a plurality of single logical qubits 412 each comprising a single physical qubit (e.g., a single ion) in the central linear region and pluralities of single logical qubits 422, 432, 442, 452, 462, 472 each comprising a single physical qubit (e.g., a single ion) in the outer linear regions in accordance with certain implementations described herein. FIG. 4D schematically illustrates a cross-sectional view of an example hexagonal prism array 400 having a plurality of single logical qubits 412 each comprising a plurality of physical qubits (e.g., a cluster 480 of two, three, four, five, six ions as shown in FIG. 4D, or more) in the central linear region and pluralities of single logical qubits each comprising a single physical qubit in the outer linear regions in accordance with certain implementations described herein. The shaded regions of FIGS. 4C and 4D schematically denote the six outer linear regions that each comprise a primary trapping region generated by the corresponding surface trap and the central linear region that comprises the overlapping serendipitous trapping regions generated by the surface traps.

FIGS. 5A-5D schematically illustrate an example system 500 comprising at least one hexagonal prism array 400 (e.g., as schematically illustrated by FIG. 4B) with an example planar QC structure 600 comprising a multilayer 2-D qubit lattice (see, e.g., U.S. Pat. Appl. Publ. No. 2021/0142204 A1, incorporated in its entirety by reference herein) in accordance with certain implementations described herein. For example, the spacing, layout, and 3-D geometric relationship between qubits at a corner of the Pyrochlore chip can be aligned to the closely matching interqubit spacing and 3-D geometry of one end of the Super Pyrochlore to enable extensions of direct couplings (e.g., entanglement) between Pyrochlore and Super Pyrochlore cells across the example system 500. In this example, direct coupling of a densely tiled, multilayer 2-D Pyrochlore gate cell (e.g., in a multi-layer, 2-D surface-trap lattice) configuration segment to one or more Super Pyrochlore cells advantageously enables further ASIC implementations with customizable combinations of high throughput across certain segments of a chip to be combined with ultrahigh processing power in certain other segments of a chip or board in accordance with certain implementations described herein.

Other Example Implementations

Implementation 1: A quantum computing (QC) system comprising a plurality of logical qubits (e.g., each logical qubit comprising one or more physical qubits) arranged in a plurality of substantially linear regions that are substantially parallel to one another, at least some of the substantially linear regions comprising two or more logical qubits and one or more qubits of each substantially linear region configured to interact with one or more qubits of at least one other substantially linear region. Quantum logic gate operations are performed using logical qubits, which can comprise at least one physical qubit (e.g., ion, neutral atom, Rydberg atom, electron, electron hole, nitrogen vacancy, quantum dot, quantum particle with multiple possible states). For example, a logical qubit can comprise multiple physical qubits (e.g., ions) for redundancy as a means for improving fault tolerance in quantum computing systems with noisy qubits, to improve logical qubit stability, and/or to decrease qubit decoherence time. For another example, a logical qubit can be accompanied by an auxiliary physical qubit for sympathetic cooling (e.g., without affecting the quantum state) of the logical qubit. Except where otherwise specified, the term "qubit" as used herein refers to a logical qubit generally comprising a single physical qubit, however, in certain implementations, additional physical qubits can be included (e.g., for fault tolerance; for cooling) without loss of generality.

Implementation 2: The system of Implementation 1, further comprising a first substrate and a second substrate, the first substrate and the second substrate substantially parallel to one another, wherein the plurality of qubits are arranged as a multiple-qubit gate array comprising a plurality of multiple-qubit gates positioned in a region between the first substrate and the second substrate, with the qubits at or near a surface of at least one of the first and second substrates arranged substantially in the plurality of substantially linear planar regions.

Implementation 3: The system of Implementation 2, wherein, for each multiple-qubit gate, each qubit is configured to be quantum-mechanically entangled with at least one of the other qubits of the multiple-qubit gate.

Implementation 4: The system of Implementation 1, wherein the two or more qubits and the one or more qubits of each substantially linear region are configured to interact directly with the one or more qubits of at least one other substantially linear region to form three dimensional (3-D) arrays configured to undergo multiple-qubit gate operations in which more than two qubits participate simultaneously.

Implementation 5: A quantum computing (QC) system comprising a plurality of multiple-qubit three dimensional (3-D) gates (e.g., arranged in geometric prisms, 3-D cells), each 3-D gate comprising at least three qubits configured to be fully connected simultaneously with one another across three dimensions, the plurality of multiple-qubit 3-D gates configured for gate operations of two or more of the multiple-qubit 3-D gates.

Implementation 6: The system of Implementation 5, wherein the plurality of multiple-qubit 3-D gates comprises ion trap arrays that are configured to have optimal coherent connectivity or entanglement directly between nearest neighbor qubits or next-nearest neighbor qubits without the need for inefficient photonic interconnects between the qubits (e.g., without teleportation; without multiple conversions between atomic and photonic qubits) that impart significant time delay and loss of net fidelity in gate operations.

Implementation 7: The system of Implementation 5, wherein the multiple-qubit 3-D gates have a substantially geometrically symmetric arrangement in order to be effected natively, in a single gate operation, without reliance on concatenations of multiple one- and two-qubit gates.

Implementation 8: The system of Implementation 5, wherein the plurality of multiple-qubit 3-D gates are configured to be operated as gates of at least one quantum FPGA (QFPGA) and/or ASIC (QASIC) chip.

Implementation 9: A quantum computing (QC) system comprising a combination of 1-D trapping regions to form quantum gates in multilayer lattice arrays comprising more than two dimensions, using the physical relationships between logical qubits (e.g., geometric arrangements; symmetric geometric structures; equilateral spatial separations) to perform quantum logic operations involving three or more logical qubits natively (e.g., effectively in a single gate operation; in the same gate operation) without reliance on concatenations of one- and two-qubit gates.

Implementation 10: The system of Implementation 9, wherein the quantum logic operations involving three or more logical qubits comprise two or more control qubits acting on one or more target qubits (e.g., multiply-controlled NOT gate; Toffoli gate; super Toffoli gate; multiply-controlled phase gate) natively.

Implementation 11: The system of Implementation 9, wherein the quantum logic operations involving three or more logical qubits comprise two or more target qubits acted on by one or more control qubits (e.g., singly-controlled, multiple NOT gate; Fanout gate; etc.) natively.

Implementation 12: The system of Implementation 9, configured to enable integration of electrical and optical elements (e.g., electrical traces; optical beam configurations; detectors; light exit ports, elements) for trapping, addressing (e.g., initializing; performing gate operations on), and low-noise read-out of quantum logic gate operations of more than two qubits participating simultaneously in multilayer lattice gate configurations (e.g., in geometric prisms; 3-D cells) that resemble 3-D crystalline structures (e.g., pyrochlores; super pyrochlores; tetrahedrons, etc.) and that are densely arrayed to further enable optimal numbers of simultaneous entanglement connections between nearest neighbor qubits, next nearest-neighbor qubits, and potentially beyond.

Implementation 13: The system of Implementation 9, with facing linear trap zones comprising a building block for the formation of 3-D configurations in which multiple linear trapping regions are coaligned, with angles between the long axes of the linear traps adjusted to form geometric prisms for added control and stability of a central region of overlapping RF nulls or serendipitous trapping zone depending on the intended quantum gate operations (e.g., for multi-qubit gates) to be performed on qubits between the multiple trapping zones.

Implementation 14: The system of Implementation 9, comprising at least one triangular prism array comprising three 1-D outer linear trap regions including a central trapping zone in accordance with certain implementations described herein. The inner angle formed by any two outer linear traps, with the central trapping zone as the vertex, equals approximately 60 degrees, forming a triangular prism that is substantially equilateral in cross section. A triangular prism enables multiple $C^3NOT$ gates to be formed along transverse axis and connected axially to form $C^6NOT$s.

Implementation 15: The system of Implementation 9, comprising at least one cubic prism array comprising four 1-D outer linear trap regions including a central trapping zone in accordance with certain implementations described herein. The inner angle formed by any two outer linear traps, with the central trapping zone as the vertex, equals approximately 90 degrees, forming a cubic prism that is substantially equilateral in cross section. A cubic prism enables multiple $C^4NOT$ gates to be formed along transverse axis and connected axially to form $C^8NOTs$.

Implementation 16: The system of Implementation 9, comprising at least one pentagonal, hexagonal, septagonal, octagonal, or other multifaceted prism arrays comprising five, six, seven, eight, or more 1-D outer linear trap regions including a central trapping zone in accordance with certain implementations described herein. The inner angle formed by any two outer linear traps, with the central trapping zone as the vertex are of approximately equal angles forming a geometric prism that is substantially equilateral in cross section. An n-sided prism enables multiple $C^nNOT$ gates to be formed along transverse axis and connected axially to form $C^{2n}NOTs$, $C^{3n}NOTs$, etc.

Implementation 17: A quantum computing (QC) system comprising a planar multilayer QC structure as disclosed by U.S. Pat. Appl. Publ. No. 2021/0142204 A1 and at least one prism-trap lattice structure as shown in FIG. 4B.

The invention has been described in several non-limiting implementations. It is to be understood that the implementations are not mutually exclusive, and elements described in connection with one implementation may be combined with, rearranged, or eliminated from, other implementations in suitable ways to accomplish desired design objectives. No single feature or group of features is necessary or required for each implementation.

For purposes of summarizing the present invention, certain aspects, advantages and novel features of the present invention are described herein. It is to be understood, however, that not necessarily all such advantages may be achieved in accordance with any particular implementation. Thus, the present invention may be embodied or carried out in a manner that achieves one or more advantages without necessarily achieving other advantages as may be taught or suggested herein.

As used herein any reference to "one implementation" or "some implementations" or "an implementation" means that a particular element, feature, structure, or characteristic described in connection with the implementation is included in at least one implementation. The appearances of the phrase "in one implementation" in various places in the specification are not necessarily all referring to the same implementation. Conditional language used herein, such as, among others, "can," "could," "might," "may," "e.g.," and the like, unless specifically stated otherwise, or otherwise understood within the context as used, is generally intended to convey that certain implementations include, while other implementations do not include, certain features, elements and/or steps. In addition, the articles "a" or "an" or "the" as used in this application and the appended claims are to be construed to mean "one or more" or "at least one" unless specified otherwise.

Spatially relative terms, such as "above," "below," "over," "under," "upper," and "lower" and the like, may be used herein for ease of description to describe one element or feature's relationship to another as illustrated in the figures. It will be understood that the spatially relative terms are intended to encompass different orientations of the components in use or operation in addition to the orientation depicted in the figures. For example, if a device in the figures is inverted, elements described as "above" or "over" other elements or features would then be oriented "below" or "beneath" the other elements or features. Thus, the exemplary term "above" can encompass both an orientation of above and below. The device may be otherwise oriented (e.g., rotated 90 degrees or at other orientations) and the spatially relative descriptors used herein interpreted accordingly. Similarly, the terms "upwardly," "downwardly," "vertical," "horizontal," and the like are used herein for the purpose of explanation only unless specifically indicated otherwise.

Language of degree, as used herein, such as the terms "approximately," "about," "generally," and "substantially," represent a value, amount, or characteristic close to the stated value, amount, or characteristic that still performs a desired function or achieves a desired result. For example, the terms "approximately," "about," "generally," and "substantially" may refer to an amount that is within ±10% of, within ±5% of, within ±2% of, within ±1% of, or within ±0.1% of the stated amount. As another example, the terms "generally parallel" and "substantially parallel" refer to a value, amount, or characteristic that departs from exactly parallel by ±10 degrees, by ±5 degrees, by ±2 degrees, by ±1 degree, or by ±0.1 degree, and the terms "generally perpendicular" and "substantially perpendicular" refer to a value, amount, or characteristic that departs from exactly perpendicular by ±10 degrees, by ±5 degrees, by ±2 degrees, by ±1 degree, or by ±0.1 degree. The ranges disclosed herein also encompass any and all overlap, sub-ranges, and combinations thereof. Language such as "up to," "at least," "greater than," "less than," "between," and the like includes the number recited. As used herein, the meaning of "a," "an," and "said" includes plural reference unless the context clearly dictates otherwise. Also, as used in the description herein, the meaning of "in" includes "into" and "on," unless the context clearly dictates otherwise.

As used herein, the terms "comprises," "comprising," "includes," "including," "has," "having" or any other variation thereof, are open-ended terms and intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present). As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain implementations require at least one of X, at least one of Y, and at least one of Z to each be present.

Thus, while only certain implementations have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the implementations described therein.

What is claimed is:

1. A quantum computing (QC) system comprising:
a plurality of qubits arranged in a plurality of substantially linear regions having longitudinal axes that are substantially parallel to one another,
at least some of the substantially linear regions comprising two or more qubits, and
one or more qubits of at least one substantially linear region simultaneously entangled with two or more qubits of at least one or more other substantially linear regions, so as to define a multi-qubit quantum gate.

2. The QC system of claim 1, wherein the plurality of substantially linear regions comprises:
a central substantially linear region having a central longitudinal axis along which central qubits of the central substantially linear region are arranged; and
at least one outer substantially linear region having a corresponding outer longitudinal axis along which outer qubits of the at least one outer substantially linear region are arranged.

3. The QC system of claim 2, wherein the at least one outer substantially linear region comprises at least two outer substantially linear regions each having a corresponding outer longitudinal axis along which the outer qubits of the outer substantially linear region are arranged, wherein the central longitudinal axis is spaced from and substantially parallel to each of the outer longitudinal axes, with each of the outer longitudinal axes at a different azimuthal position about the central longitudinal axis.

4. The QC system of claim 3, wherein the at least two outer substantially linear regions comprise two outer substantially linear regions with two corresponding outer longitudinal axes at different azimuthal positions about the central longitudinal axis, the outer longitudinal axes separated from one another by approximately 180 degrees.

5. The QC system of claim 3, wherein the at least two outer substantially linear regions comprise three outer substantially linear regions with three corresponding outer longitudinal axes at different azimuthal positions about the central longitudinal axis, the outer longitudinal axes separated from one another by approximately 120 degrees.

6. The QC system of claim 3, wherein the at least two outer substantially linear regions comprise four outer substantially linear regions with four corresponding outer longitudinal axes at different azimuthal positions about the central longitudinal axis, the outer longitudinal axes separated from one another by approximately 90 degrees or approximately 180 degrees.

7. The QC system of claim 3, wherein the at least two outer substantially linear regions comprise five outer substantially linear regions with five corresponding outer longitudinal axes at different azimuthal positions about the central longitudinal axis, the outer longitudinal axes separated from one another by approximately 72 degrees or approximately 144 degrees.

8. The QC system of claim 3, wherein the at least two outer substantially linear regions comprise six outer substantially linear regions with six corresponding outer longitudinal axes at different azimuthal positions about the central longitudinal axis, the outer longitudinal axes separated from one another by approximately 60 degrees, approximately 120 degrees, or approximately 180 degrees.

9. The QC system of claim 1, wherein the plurality of substantially linear regions comprises one substantially linear region having qubits arranged along one longitudinal axis and another substantially linear region having qubits arranged along another longitudinal axis, the QC system further comprising first and second substantially linear surface traps, wherein the qubits of the one substantially linear region are within one trapping region comprising a primary electropotential trapping region generated by the first substantially linear surface trap and an overlapping serendipitous electropotential trapping region generated by the second substantially linear surface trap, and the qubits of the other substantially linear region are within another trapping region comprising a primary electropotential trapping region generated by the second substantially linear surface trap and an overlapping serendipitous electropotential trapping region generated by the first substantially linear surface trap.

10. The QC system of claim 1, wherein the plurality of qubits comprises a central substantially linear chain of qubits and at least two outer substantially linear chain of qubits.

11. The QC system of claim 10, further comprising a first substantially linear surface trap, wherein one of the at least two outer substantially linear chains of qubits is within a primary electropotential trapping region generated by the first substantially linear surface trap and the central substantially linear chain of qubits is within a serendipitous electropotential trapping region generated at least in part by the first substantially linear surface trap.

12. The QC system of claim 11, further comprising a second substantially linear surface trap, wherein another of the at least two outer substantially linear chains of qubits is within a primary electropotential trapping region generated by the second substantially linear surface trap, and the serendipitous electropotential trapping region is generated at least in part by the second substantially linear surface trap.

13. The QC system of claim 1, wherein the plurality of qubits comprises chains of ions that are confined within substantially linear electropotential wells generated by at least one substantially linear surface traps.

14. The QC system of claim 13, wherein the ions comprise $Ba^+$; $Be^+$; $Cd^+$; $Ca^+$; $Mg^+$; $Hg^+$; $Sr^+$; or $Yb^+$.

15. The QC system of claim 1, further comprising three or more substantially linear surface traps substantially parallel to one another and configured to generate electropotential wells configured to contain the plurality of qubits in the plurality of substantially linear regions.

16. The QC system of claim 1, wherein the plurality of substantially linear regions comprises a central trapping region comprising a central chain of qubits along a central longitudinal axis and at least two outer trapping regions each comprising a corresponding outer chain of qubits along a corresponding outer longitudinal axis, the central chain of qubits comprising two or more qubits configured to interact with one another and with one or more qubits of at least one of the outer chains of qubits, each outer chain of qubits comprising two or more qubits configured to interact with one another and with one or more qubits of the central chain of qubits.

17. The QC system of claim 16, wherein the at least two outer trapping regions comprise three, four, five, or six trapping regions adjacent to the central trapping region and having outer longitudinal axes that are substantially parallel to one another and to the central longitudinal axis of the central trapping region.

18. The QC system of claim 16, wherein the plurality of qubits form $C^6$NOT gates arranged along the central longitudinal axis.

19. The QC system of claim 16, wherein the plurality of qubits form $C^{2n}$NOT gates arranged along the central longitudinal axis, where n is a positive integer greater than or equal to 2.

20. A quantum computing (QC) system comprising:
a plurality of qubits arranged in a plurality of substantially linear regions having longitudinal axes that are substantially parallel to one another, at least some of the substantially linear regions comprising two or more qubits and one or more qubits of each substantially linear region configured to interact with one or more qubits of at least one other substantially linear region;
a central substantially linear region having a central longitudinal axis along which central qubits of the central linear region are arranged; and
at least one outer substantially linear region having a corresponding outer longitudinal axis along which outer qubits of the at least one outer substantially linear region are arranged, the at least one outer substantially linear region comprising at least two outer substantially linear regions each having a corresponding outer longitudinal axis along which the outer qubits of the outer substantially linear region are arranged, the central longitudinal axis spaced from and substantially parallel to each of the outer longitudinal axes, with each of the outer longitudinal axes located at a different azimuthal position about the central longitudinal axis.

21. A quantum computing (QC) system comprising:
a central substantially linear region having a central longitudinal axis;
at least two outer substantially linear regions each having a corresponding outer longitudinal axis, the central longitudinal axis spaced from and substantially parallel to each of the outer longitudinal axes, with each corresponding outer longitudinal axis located at a different azimuthal position about the central longitudinal axis; and
a plurality of qubits each arranged in (a) the central substantially linear region or (b) one of the at least two outer substantially linear regions, such that two or more of the plurality of qubits each in two or more of (a) the central substantially linear region or (b) one of the at least two outer substantially linear regions interact, so as to define a quantum gate.

22. The QC system of claim 21, wherein the at least two outer substantially linear regions comprise six outer substantially linear regions with six corresponding outer longitudinal axes located at different azimuthal positions about the central longitudinal axis, the outer longitudinal axes separated from one another by approximately 60 degrees, approximately 120 degrees, or approximately 180 degrees.

23. The QC system of claim 1, wherein the one or more qubits of each substantially linear region entangled with one or more qubits of at least one other substantially linear region collectively define a 3-D lattice structure.

24. A quantum computing (QC) system comprising:
a plurality of qubits arranged in a plurality of substantially linear regions having longitudinal axes that are substantially parallel to one another,
at least some of the substantially linear regions comprising two or more qubits, and
one or more qubits of each substantially linear region entangled with (a) two or more qubits from one or more of at least one other substantially linear region or (b) one or more qubits of an overlapping serendipitous electropotential trapping region generated by each substantially linear region and the at least one other substantially linear region, so as to define a quantum gate.

25. The QC system of claim 24, wherein the plurality of substantially linear regions comprises:
a central substantially linear region having a central longitudinal axis along which central qubits of the central substantially linear region are arranged; and
at least one outer substantially linear region having a corresponding outer longitudinal axis along which outer qubits of the at least one outer substantially linear region are arranged.

26. The QC system of claim 25, wherein the at least one outer substantially linear region comprises at least two outer substantially linear regions each having a corresponding outer longitudinal axis along which the outer qubits of the outer substantially linear region are arranged, wherein the central longitudinal axis is spaced from and substantially parallel to each of the outer longitudinal axes, with each of the outer longitudinal axes at a different azimuthal position about the central longitudinal axis.

27. The QC system of claim 26, wherein the at least two outer substantially linear regions comprise two outer substantially linear regions with two corresponding outer longitudinal axes, three outer substantially linear regions with three corresponding outer longitudinal axes, four outer substantially linear regions with four corresponding outer longitudinal axes, five outer substantially linear regions with five corresponding outer longitudinal axes, or six outer substantially linear regions with six corresponding outer longitudinal axes at different azimuthal positions about the central longitudinal axis, and wherein the outer longitudinal axes separated from one another by approximately 60 degrees, approximately 72 degrees, approximately 90 degrees, approximately 120 degrees, approximately 144 degrees, or approximately 180 degrees.

28. The QC system of claim 24, wherein the plurality of qubits comprises chains of ions that are confined within substantially linear electropotential wells generated by at least one substantially linear surface traps.

29. The QC system of claim 28, wherein the ions comprise $Ba^+$; $Be^+$; $Cd^+$; $Ca^+$; $Mg^+$; $Hg^+$; $Sr^+$; or $Yb^+$.

30. The QC system of claim 24, wherein the plurality of substantially linear regions comprises a central trapping region comprising a central chain of qubits along a central longitudinal axis and at least two outer trapping regions each comprising a corresponding outer chain of qubits along a corresponding outer longitudinal axis, the central chain of qubits comprising two or more qubits configured to interact with one another and with one or more qubits of at least one of the outer chains of qubits, each outer chain of qubits comprising two or more qubits configured to interact with one another and with one or more qubits of the central chain of qubits.

31. The QC system of claim 30, wherein the plurality of qubits form $C^{2n}$NOT gates arranged along the central longitudinal axis, where n is a positive integer greater than or equal to 2.

* * * * *